US012694111B2

(12) United States Patent 
Fitzgerald

(10) Patent No.: US 12,694,111 B2 
(45) Date of Patent: Jul. 28, 2026

(54) APPARATUS, ARTICLES OF MANUFACTURE, AND METHODS FOR SUPPRESSION OF FALSE POSITIVE MALWARE DETECTION

(71) Applicant: McAfee, LLC, San Jose, CA (US)

(72) Inventor: Niall Fitzgerald, Cork (IE)

(73) Assignee: McAfee, LLC, San Jose, CA (US)

( * ) Notice: Subject to any disclaimer, the term of this patent is extended or adjusted under 35 U.S.C. 154(b) by 425 days.

(21) Appl. No.: 18/068,298

(22) Filed: Dec. 19, 2022

(65) Prior Publication Data

US 2024/0202339 A1     Jun. 20, 2024

(51) Int. Cl.
*G06F 21/53*     (2013.01)
*G06F 21/56*     (2013.01)

(52) U.S. Cl.
CPC ............ *G06F 21/568* (2013.01); *G06F 21/53* (2013.01)

(58) Field of Classification Search
CPC ... G06F 21/568; G06F 21/56; H04L 63/1441; H04L 41/16; G06N 20/00
See application file for complete search history.

(56) References Cited

U.S. PATENT DOCUMENTS

| | | | | |
|---|---|---|---|---|
| 11,222,113 B1* | 1/2022 | Li | ........................ | G06F 21/568 |
| 2011/0107424 A1* | 5/2011 | Singh | .................. | G06F 11/1417 |
| | | | | 726/24 |
| 2012/0323829 A1* | 12/2012 | Stokes | .................. | G06F 21/563 |
| | | | | 706/50 |
| 2019/0138722 A1* | 5/2019 | Krcál | ..................... | H04W 12/12 |
| 2019/0188380 A1* | 6/2019 | Animireddygari | ... | G06F 21/568 |
| 2019/0303571 A1* | 10/2019 | Chelarescu | ......... | H04L 63/1416 |
| 2023/0362184 A1* | 11/2023 | Gelman | .............. | H04L 63/1433 |

* cited by examiner

*Primary Examiner* — Glenton B Burgess

(74) *Attorney, Agent, or Firm* — Hanley, Flight & Zimmerman, LLC

(57) ABSTRACT

Methods, apparatus, systems, and articles of manufacture are disclosed for suppression of false positive malware detection. An example apparatus includes at least one memory, machine-readable instructions, and processor circuitry to at least one of instantiate or execute the machine-readable instructions to execute a machine-learning model based on a feature associated with an executable file to generate a malware detection output. The processor circuitry is further to, identify, after a first determination that the malware detection output identifies the executable file as malware, the malware detection output as a false positive malware detection output based on the feature invoking a false positive suppression rule. Additionally, the processor circuitry is to cause execution of the executable file based on the identification of the malware detection.

25 Claims, 12 Drawing Sheets

| | FEATURE 1 | FEATURE 2 | FEATURE 3 | FEATURE 4 | ... | FEATURE N |
|---|---|---|---|---|---|---|
| FALSE POSITIVE SAMPLE 1 | FALSE | TRUE | 0x14c | 160 | ... | 58087956 |
| FALSE POSITIVE SAMPLE 2 | FALSE | TRUE | 0x3f6 | 8560 | ... | 6267da97 |
| FALSE POSITIVE SAMPLE 3 | TRUE | FALSE | 0x47d | 8160 | ... | 4650b8ed |
| FALSE POSITIVE SAMPLE 4 | FALSE | FALSE | 0xbbb | 8000 | ... | 60179bdf |
| ... | ... | ... | ... | ... | ... | ... |
| FALSE POSITIVE SAMPLE N | FALSE | TRUE | 0x43e | 0 | ... | 45e5fc0e |

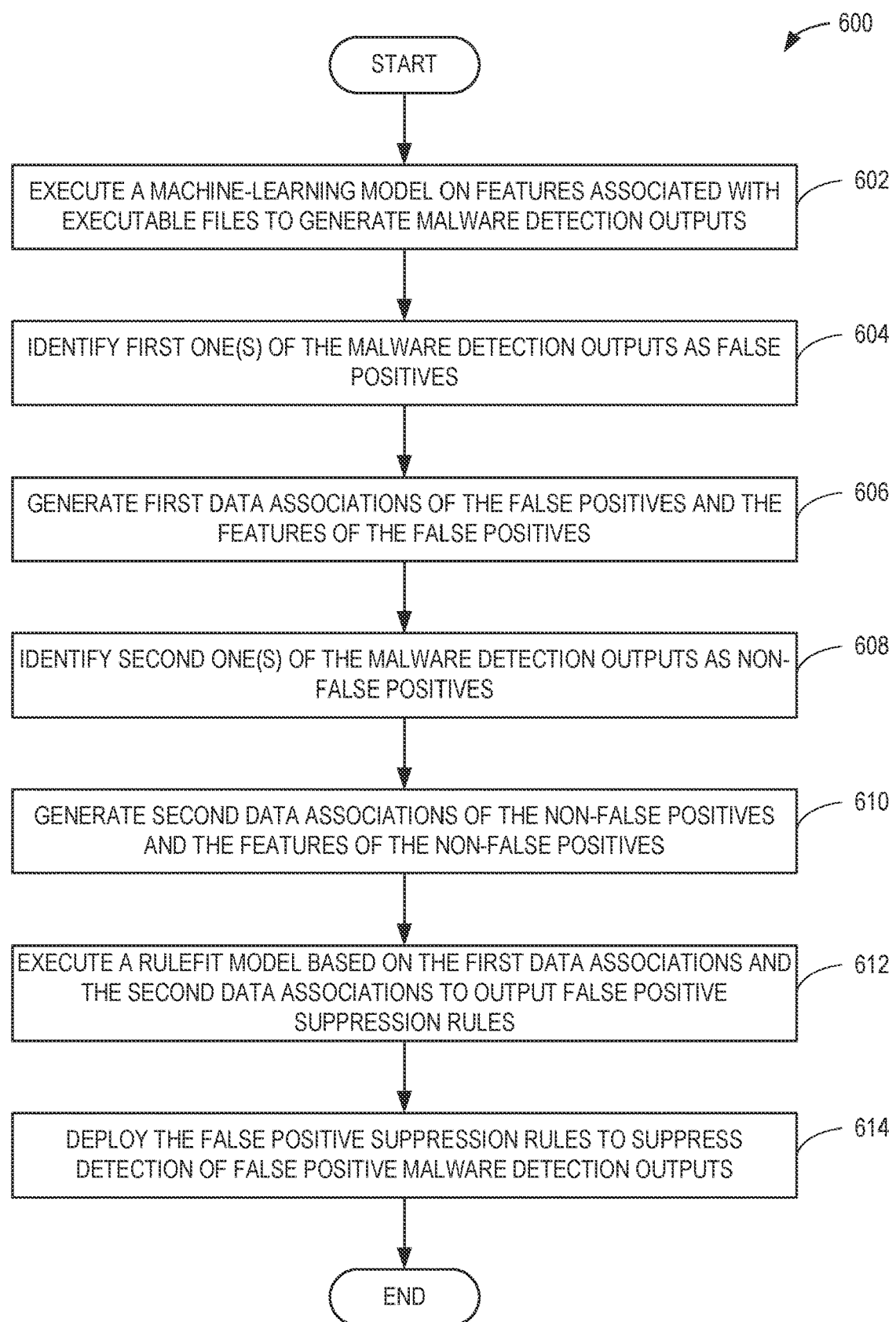

600

START

EXECUTE A MACHINE-LEARNING MODEL ON FEATURES ASSOCIATED WITH EXECUTABLE FILES TO GENERATE MALWARE DETECTION OUTPUTS ⸝ 602

IDENTIFY FIRST ONE(S) OF THE MALWARE DETECTION OUTPUTS AS FALSE POSITIVES ⸝ 604

GENERATE FIRST DATA ASSOCIATIONS OF THE FALSE POSITIVES AND THE FEATURES OF THE FALSE POSITIVES ⸝ 606

IDENTIFY SECOND ONE(S) OF THE MALWARE DETECTION OUTPUTS AS NON-FALSE POSITIVES ⸝ 608

GENERATE SECOND DATA ASSOCIATIONS OF THE NON-FALSE POSITIVES AND THE FEATURES OF THE NON-FALSE POSITIVES ⸝ 610

EXECUTE A RULEFIT MODEL BASED ON THE FIRST DATA ASSOCIATIONS AND THE SECOND DATA ASSOCIATIONS TO OUTPUT FALSE POSITIVE SUPPRESSION RULES ⸝ 612

DEPLOY THE FALSE POSITIVE SUPPRESSION RULES TO SUPPRESS DETECTION OF FALSE POSITIVE MALWARE DETECTION OUTPUTS ⸝ 614

END

FIG. 6

APPARATUS, ARTICLES OF MANUFACTURE, AND METHODS FOR SUPPRESSION OF FALSE POSITIVE MALWARE DETECTION

FIELD OF THE DISCLOSURE

This disclosure relates generally to computer security and, more particularly, to apparatus, articles of manufacture, and methods for suppression of false positive malware detection.

BACKGROUND

Malicious software, known as "malware," can attack various computing devices via a network, such as the Internet. Malware may include any program or file that is intentionally harmful to a computer, such as computer virus programs, Internet bots, spyware, computer worms and other standalone malware computer programs that replicate to spread to other computers, Trojan horse and other non-replicating malware, or any computer program that gathers information about a computer, its user, or otherwise operates without permission. Protecting computing devices from such malware can be a significant challenge.

BRIEF DESCRIPTION OF THE DRAWINGS

FIG. 4 is a table of example false positive samples and corresponding example features.

FIG. 6 is a flowchart representative of example machine-readable instructions and/or example operations that may be executed by example processor circuitry to implement the false positive suppressor of FIGS. 1 and/or 2 to generate false positive suppression rules.

DETAILED DESCRIPTION

Figure 1:
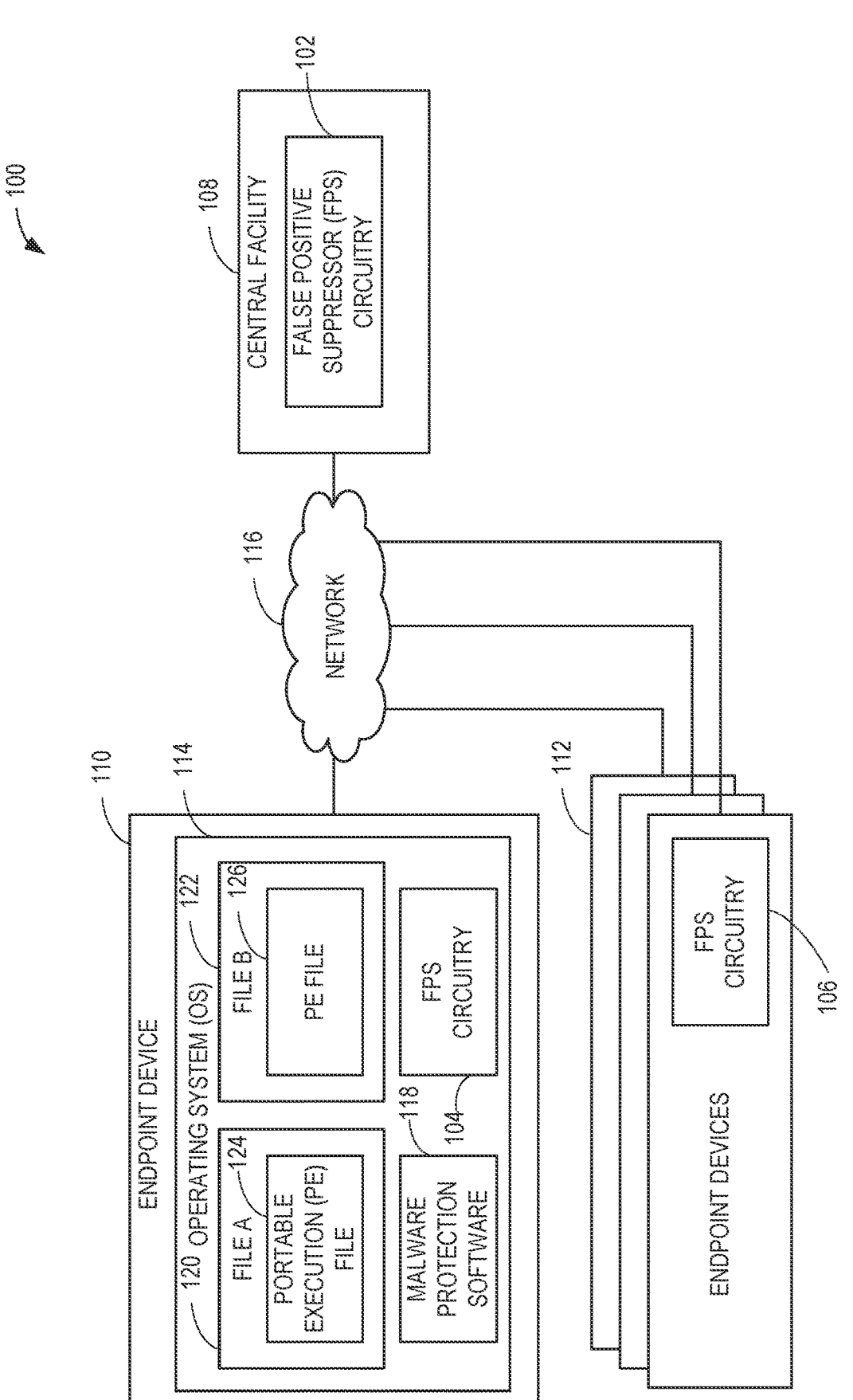
FIG. 1 is an illustration of an example computer security environment including an example false positive suppressor to reduce false positive outputs from a machine-learning model for malware detection.

In general, the same reference numbers will be used throughout the drawing(s) and accompanying written description to refer to the same or like parts. The figures are not to scale.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

In computing and/or electronic environments, malicious actors aim to conceal their attacks on computing and/or electronic devices, computing and/or electronic systems, etc., by leveraging legitimate or trusted software applications. A common attack strategy can be embedding and/or integrating computer files with malicious portable executable (PE) files that, when executed and/or instantiated, can compromise a computing and/or electronic device. PE is a file format used for executables (e.g., executable files with an ".EXE" file name extension, executable files with an ".SCR" file name extension, etc.), object code, and dynamic-link libraries (DLLs). The PE file format is a data structure that encapsulates executable code with the information necessary for an operating system (OS) (e.g., Microsoft Windows® OS) loader to manage the encapsulated or wrapped executable code. For example, the information can include dynamic library references for linking, API export, import tables, resource management data, and Transport Layer Security (TLS) data.

By way of example, a user may download a compromised computer file, such as a Portable Document Format (PDF) file, onto an endpoint device. The compromised PDF file may include a PE file that is malware. Malware may include any program or file that is intentionally harmful to a computer, such as computer virus programs, Internet bots, spyware, computer worms and other standalone malware computer programs that replicate to spread to other computers, Trojan horse and other non-replicating malware, or any computer program that gathers information about a computer, its user, or otherwise operates without permission. Continuing with the example, the user may open the PDF and click and/or select an icon in the PDF, a hyperlink in the PDF, etc., that executes and/or instantiates the malware that is disguised as a legitimate or innocuous PE file. After the malware is executed and/or instantiated, the endpoint device may become compromised, such as by locking out the user from accessing the endpoint device, transmitting sensitive data to another endpoint device associated with a malicious actor, etc.

To protect endpoint devices from such malware attacks, an endpoint device can host, execute, and/or instantiate malware protection software (e.g., anti-malware software, anti-virus software, etc.). In some instances, the malware protection software can analyze, scan, etc., a file, a PE file, etc., to determine whether the file, the PE file, etc., is trustworthy or contains malware. For example, the malware protection software can provide a PE file, a file that includes the PE file, etc., to a malware detection model as an input to generate an output, which can include a classification and/or identification of the PE as malware or non-malware.

Some malware detection models may be implemented by machine-learning models. Machine-learning models, such as supervised machine-learning models, can provide and/or output a probabilistic classification during inference on new samples (e.g., a code object, a software application, a file, a PE file, etc.). When deployed on endpoint devices, the efficacy of such machine-learning models can be measured by metrics such as precision, recall, false positive rate, and true positive rate. Depending on the application and/or computing environment, some metrics have increased importance where appetite for true positives (e.g., a detection of malware when a sample is malware) can outweigh tolerance for false positives (e.g., a detection of malware when a sample is not malware) or vice-versa. In some computing environments, such as settings involving malware detection, there may be a low tolerance for false positives due to the negative impact on user experience (e.g., customer experience, consumer experience, enterprise experience, etc.). Negative user experiences may include downtime of computing and/or electronic systems due to invocation of malware protection operations, repetitive alerts of erroneous malware detection, etc.

When machine-learning models are trained to classify malware and are tuned to have a low false positive rate, false positives may still occur and negatively impact users, computing and/or electronic systems, etc. For example, a relatively low number of false positives output from a machine-learning model may not outweigh the benefit of many true positive malware detections by the machine-learning model. To address this imbalance, some machine-learning models may be retrained so that the machine-learning models no longer identify samples that cause false positive malware detections. However, such retraining can be time-consuming, computationally intensive, and sensitivity of the original machine-learning models to detect new malware attacks can be decreased.

In some instances, samples that cause false positives may be suppressed. For example, a PE that is known to cause a false positive malware detection can be excluded or suppressed from the malware detection process. However, challenges exist with suppression because defining specific feature-based criteria related only to the samples requiring the suppression is complex. For example, a machine-learning model may analyze hundreds or thousands of individual sample features and, if the approach to identifying features associated with false positives is too broad or generic, then too many malware detections of samples may be erroneously suppressed. Such broad or generic feature identification may result in a loss of efficacy and/or performance of the machine-learning model, reduced user benefit, etc. Conversely, if feature identification is too specific, then a relatively few number, if any, malware detections of samples will be suppressed. In some instances, the identifying of features for malware detection suppression is a manually intensive process in which features of samples are manually inspected and/or examined and rules for malware detection suppression are manually derived. Such manual inspection, examination, and derivation is substantially time consuming and prone to human error.

Examples disclosed herein include apparatus, articles of manufacture, and methods for suppression of false positive malware detection. In some disclosed examples, a false positive suppressor derives (e.g., automatically derives, autonomously derives, etc.) rules for identification of samples for which machine-learning malware detection classifications are to be suppressed during model inference. For example, the suppressed samples can be identified as samples that are likely to be false positives that will negatively impact model efficacy performance metrics and/or user experience. Advantageously, examples disclosed herein can identify samples for suppression in a scalable fashion or manner whilst also implementing a balanced trade-off between over and under suppression. Advantageously, examples disclosed herein can identify features for suppression based on false positive samples to remove manual processes of prior suppression techniques whilst achieving full automation and/or scalability for improved malware detection.

FIG. 1 is an illustration of an example computer security environment 100 including example false positive suppressor (FPS) circuitry 102, 104, 106 to reduce false positive outputs from a machine-learning model for malware detection. The computer security environment 100 of the illustrated example includes an example central facility 108, which includes first example FPS circuitry 102.

The central facility 108 of the illustrated example can be implemented by a public and/or private cloud services provider. For example, the central facility 108 can be implemented by one or more servers and/or one or more other computing and/or electronic devices. In some examples, the one or more servers are physical hardware servers (e.g., rack-mount servers, blade servers, etc.). In some examples, the one or more servers are virtualizations of physical hardware servers. In some examples, the one or more servers are a combination of physical hardware server (s) and/or virtualization(s) of the physical hardware server (s).

The computer security environment 100 of the illustrated example includes example endpoint devices 110, 112, which include a first example endpoint device 110 and a plurality of second example endpoint devices 112. The computer security environment 100 of the illustrated example is a malware security or protection environment. For example, the central facility 108 and/or the endpoint devices 110, 112 can be controlled, operated, executed, instantiated, etc., to protect endpoint devices, such as the endpoint devices 110, 112, from compromise by malicious actors, malware attacks, etc.

In the illustrated example of FIG. 1, the endpoint devices 110, 112 are physical devices that connect to and/or exchange information with a network (e.g., a computer network, an electronic network, a peer-to-peer (P2P) network, a mesh network, etc.), such as an example network 116 depicted in FIG. 1. For example, the first endpoint device 110 and/or one(s) of the second endpoint devices 112 can be personal computers (e.g., desktop computers, laptop computers, etc.) executing and/or instantiating an example operating system (OS) 114. Alternatively, one or more of the endpoint devices 110, 112 may be a server, a handheld or mobile device (e.g., a smartphone (e.g., an Internet-enabled smartphone), a tablet (e.g., a tablet computer), etc.), a vehicle (e.g., a drone, an aerial vehicle (e.g., an aircraft, a helicopter, etc.), a land vehicle (e.g., an automobile, a bus, a train, etc.), a marine vehicle, etc.), an autonomous vehicle, a wearable device (e.g., a smartwatch, smart glasses, a headset, etc.) or any other type of computing and/or electronic device. In some examples, one(s) of the second endpoint devices 112 is/are not connected to the network 116. For example, disconnected one(s) of the second endpoint devices 112 can execute and/or instantiate the third FPS circuitry 106 on local and/or offline data for enhanced security and/or privacy.

In the illustrated example of FIG. 1, the endpoint devices 110, 112 are in communication with one(s) of each other and/or the central facility 108 via the network 116. The network 116 of the example of FIG. 1 is the Internet. However, the network 116 can be implemented using any suitable wired and/or wireless network(s) including, for example, one or more data buses, one or more Local Area Networks (LANs), one or more Wireless Local Area Networks (WLANs), one or more cellular networks, one or more private networks, one or more public networks, etc.

The first endpoint device 110 executes and/or instantiates the OS 114, which can store, execute, and/or instantiate example malware protection software 118, second example FPS circuitry 104, a first example file 120 (identified by FILE A), and a second example file 122 (identified by FILE B). One(s) of the second endpoint devices 112 include the third FPS circuitry 106. In some examples, one(s) of the second endpoint devices 112 can include, store, execute, and/or instantiate one or more portion(s) of the first endpoint device 110. For example, one(s) of the second endpoint devices 112 can include the second FPS 104, the OS 114, the malware protection software 118, the first file 120, and/or the second file 122. In some examples, the FPS 102, 104, 106 can include, execute, and/or instantiate the malware protection software 118.

In some examples, the first FPS circuitry 102, the second FPS circuitry 104, and the third FPS circuitry 106 are the same. For example, the first FPS 102, the second FPS 104, and the third FPS 106 can be instances of each other, be the same build or version (e.g., software build or version), etc. In some examples, one(s) of the first FPS 102, the second FPS 104, and/or the third FPS 106 are different from one or more of the FPS 102, 104, 106. For example, a first version of the first FPS 102 can be different from a second version of the second FPS 104 and/or a third version of the third FPS 106. As used herein, the description of the first FPS 102 can be applicable to one or more of the second FPS 104 and/or the FPS 106. Likewise, the description of the second FPS 104 and/or the third FPS 106 can be applicable to the first FPS 102.

The first endpoint device 110 includes the OS 114 to access, execute, and/or instantiate files, such as the first file 120 and/or the second file 122, to perform and/or carry out operations (e.g., computing and/or electronic operations, user operations, etc.), workloads (e.g., computing and/or electronic workloads, user workloads, etc.), etc. For example, the first file 120 and/or the second file 122 can have any data format such as, for example, binary data, comma delimited data, tab delimited data, structured query language (SQL) structures, etc. In some examples, the first file 120 and/or the second file 122 can be productivity software files (e.g., word processing files, spreadsheet files, database files, slide presentation files, Portable Document Files (PDFs), etc.). Alternatively, the first file 120 and/or the second file 122 may be any other type of file.

The first file 120 includes a first example portable execution (PE) file 124 and the second file 122 includes a second example PE file 126. In some examples, the first file 120 and/or the second file 122 is/are container files because they can respectively include and/or container one or more other files, subfiles, etc., such as PE files. For example, the first file 120 can be a PDF that includes one or more PE files, such as the first PE file 124. In some examples, the second file 122 can be a word processing file that includes an image file implemented by the second PE file 126. Alternatively, the first PE file 124 and/or the second PE file 126 may be a Common Object File Format (COFF) file.

The PE files 124, 126 have a plurality of characteristics, elements, features, or traits. In some examples, the PE files 124, 126 can include and/or have a feature such as an attribute certificate that is used to associate verifiable statements (e.g., statements from an originator of the PE files 124, 126) with a file, an image, etc. In some examples, the PE files 124, 126 can include and/or have a feature such as a date and/or time stamp. In some examples, the PE files 124, 126 can include and/or have a feature such as a file pointer to describe a location of an item or datum within the PE files 124, 126 themselves before being processed by the linker (in the case of object files) or the loader (in the case of image files). For example, the file pointer can be representative of a position within the PE files 124, 126 as stored on disk (e.g., hard-disk drive, flash storage, etc.). In some examples, the PE files 124, 126 can include and/or have a feature such as a linker reference, which can be a reference to the linker that is provided with the OS 114 or software associated thereof.

In some examples, the PE files 124, 126 can include and/or have a feature based on a format of the PE files 124, 126. For example, the PE files 124, 126 can have a data structure that includes a PE header, an original equipment manufacturer (OEM) identifier, information, and/or offset to the PE header. In some examples, the PE files 124, 126 can include and/or have a feature based on the format such as a stub program and relocation table associated with the OS 114. In some examples, the PE files 124, 126 can include and/or have a feature based on the format such as an executable header (e.g., an MS-DOS 2.0 Compatible EXE header), section headers, and/or image pages (e.g., import information, export information, base relocations, resource information, etc.).

In some examples, the PE files 124, 126 can include and/or have a feature such as a value of a data field. For example, the data field can be a machine field (e.g., a machine data field) or machine type field, which can specify a type of processor circuitry of the endpoint devices 110, 112. In some examples, the data field can be a characteristics field (e.g., a characteristics data field), which can contain flags that indicate attributes of the PE files 124, 126. For example, the characteristics field can be a relocations stripped flag that can have a value of 0x0001, which indicates that the PE files 124, 126 do not contain base relocations and must therefore be loaded at its preferred base address. If the base address is not available, the loader (e.g., the loader of the OS 114) reports an error.

In some examples, the characteristics field can be a load from network media and copy to swap file flag that can have a value of 0x0800, which can indicate that if the PE files 124, 126 are on network media, then the OS 114 is to fully load the PE files 124, 126 and copy them to the swap file(s). In some examples, the characteristics field can be a file system flag that can have a value of 0x1000, which indicates that the PE files 124, 126 are system files and not user programs. Alternatively, the characteristics field may be any other type of flag associated with the OS 114.

In some examples, the PE files 124, 126 can include and/or have a feature such as an optional header magic number that determines whether the PE files 124, 126 are images and/or PE32 or PE32+ executable. For example, if the PE files 124, 126 include a header with a magic number of 0x10b, then the PE files 124, 126 have a PE32 format. In some examples, if the PE files 124, 126 include a header with a magic number of 0x20b, then the PE files 124, 126 have a PE32+ format.

In some examples, the PE files 124, 126 can include and/or have a feature representative of an OS-specific data field. For example, the feature can be an image base field (e.g., ImageBase) that is representative of the preferred address of the first byte of the PE files 124, 126 when loaded into memory of the endpoint devices 110, 112. In some examples, the feature can be an OS system version field to indicate the major version of the OS 114 (e.g., MajorOperatingSystem Version data field) or the minor version of the OS 114 (e.g., MinorOperatingSystem Version data field). In some examples, the feature can be a major version field to indicate the major version of the PE files 124, 126 (e.g., MajorImage Version data field) or the minor version of the PE files 124, 126 (e.g., MinorImage Version data field). Alternatively, the feature can be any other type of data field, such as a size (e.g., a data size) of the PE files 124, 126, a size of the headers of the PE files 124, 126, a check sum value of the PE files 124, 126, a type of subsystem and/or characteristics thereof required to execute and/or instantiate the PE files 124, 126, characteristics of one or more DLLs associated with the PE files 124, 126, section table, section headers, section flags, etc.

In some examples, a signature of the PE files 124, 126 can be a feature. For example, the FPS circuitry 102, 104, 106 can generate and/or determine a signature of the PE files 124, 126 by executing a hash algorithm and/or function on the PE files 124, 126, or portion(s) thereof, to generate a hash value. For example, a hash value of the first PE file 124 can be a signature of the first PE file 124 and thereby be a feature of the first PE file 124. In some examples, the FPS circuitry 102, 104, 106 can generate the signature of the first PE file 124 by executing a cyclic redundancy check (CRC) hash function to generate a hash value (e.g., a checksum value, a CRC value, a CRC hash value, etc.) and identifying the hash value as the signature of the first PE file 124. Additionally or alternatively, the FPS circuitry 102, 104, 106 can generate the hash value, and/or, more generally, the signature, of the PE files 124, 126 using any other hash algorithm and/or function.

In example operation, the endpoint devices 110, 112 can obtain a file for execution and/or instantiation, such as the files 120, 122. In some examples, prior to execution and/or instantiation of the files 120, 122, the endpoint devices 110, 112 can provide the files 122, 122, or portion(s) thereof, such as the PE files 124, 126, to the second FPS 104 and/or the third FPS 106. In some examples, the endpoint devices 110, 112 can provide the files 122, 122, or portion(s) thereof, to the first FPS 102 via the network 116.

In example operation, the FPS 102, 104, 106 can extract features, such as those described above, of the PE files 124, 126, and/or, more generally, the files 120, 122. In example operation, the FPS 102, 104, 106 can execute and/or instantiate a machine-learning model trained to detect and/or identify malware. In example operation, the FPS 102, 104, 106 can execute and/or instantiate the machine-learning model using the features as inputs (e.g., model inputs, machine-learning model inputs, etc.) to generate outputs (e.g., model outputs, machine-learning model outputs, etc.), which can include a malware detection output and/or identification. For example, the malware detection output can identify the PE files 124, 126, and/or, more generally, the files 120, 122 as malicious files because they are likely to be, include, and/or be associated with malware.

In example operation, the FPS 102, 104, 106 can determine whether the malware detection output is a false positive malware detection. For example, the FPS 102, 104, 106 can compare features of the PE files 124, 126, and/or, more generally, the files 120, 122, to false positive suppression rules. In some examples, the false positive suppression rules are representative of features that can cause a false positive detection of malware.

In example operation, after a determination that one(s) of the features invoke one(s) of the false positive suppression rules, the FPS 102, 104, 106 can suppress the false positive detection of malware. For example, the FPS 102, 104, 106 can determine that a file size of the PE files 124, 126 invokes a first false positive suppression rule by matching a file size specified by a first false positive suppression rule. In some examples, based on the matching, the FPS 102, 104, 106 can determine at least in part that the PE files 124, 126 are likely to not be malicious or contain malware. In some examples, the FPS 102, 104, 106 can determine that a name field of a section header of a section table of the PE files 124, 126 invokes a second false positive suppression rule by at least partially matching a name field of a section header of a section table specified by a second false positive suppression rule. In some examples, based on at least the partial matching, the FPS 102, 104, 106 can determine at least in part that the PE files 124, 126 are likely to not be malicious or contain malware.

In example operation, after a determination to suppress a detection and/or identification of the PE files 124, 126 as malware (and thereby determine that the detection/identification is a false positive), the FPS 102, 104, 106 can drop the detection/identification and/or change the detection/identification to a different classification, such as changing the classification from true positive (e.g., a true positive detection of malware) to a false positive (e.g., a false positive detection of malware). After the suppression, the FPS circuitry 102, 104, 106 can direct the OS 114 to resume execution and/or instantiation of the PE files 124, 126, and/or, more generally, the files 120, 122.

Alternatively, in some examples, the FPS circuitry 102, 104, 106 can determine not to suppress or allow the malware detection output to proceed after a determination that one(s) of the features of the PE files 124, 126 do not invoke one(s) of the false positive suppression rules. In example operation, the FPS 102, 104, 106 can alert the malware protection software 118 that the PE files 124, 126 are likely to be malware. In some examples, the malware protection software 118 can execute, perform, and/or carry out one or more malware protection operations. For example, the malware protection software 118 can quarantine one(s) of the PE files 124, 126, and/or, more generally, the files 120, 122, in secure and/or isolated storage of the OS 114. In some examples, the malware protection software 118 can prevent and/or cease execution and/or instantiation of the PE files 124, 126, and/or, more generally, the files 120, 122, by the OS 114. In some examples, the malware protection software 118 can delete and/or cause deletion or removal of the PE files 124, 126, and/or, more generally, the files 120, 122, from the endpoint devices 110, 112. In some examples, the malware protection software 118 can sandbox the PE files 124, 126, and/or, more generally, the files 120, 122. In some examples, the FPS 102, 104, 106, the malware protection software 118, and/or, more generally, the endpoint devices 110, 112 can cause transmission of telemetry data to the central facility 108. For example, the first FPS 102 can obtain the files 120, 122, the PE files 124, 126, feature(s) thereof, version(s) of the false positive suppression rules used by the endpoint devices 110, 112, characteristics of the endpoint devices 110, 112 (e.g., a type and/or version of the OS 114, a type and/or version of the malware protection software 118, a type and/or version of the second FPS 104, a type and/or version of the third FPS 106, etc.). In some examples, the first FPS 102 can train (or retrain) the machine-learning model(s) used by the central facility 108 and/or the endpoint devices 110, 112 for malware detection and/or protection of the endpoint devices 110, 112 from malware.

Figure 2:
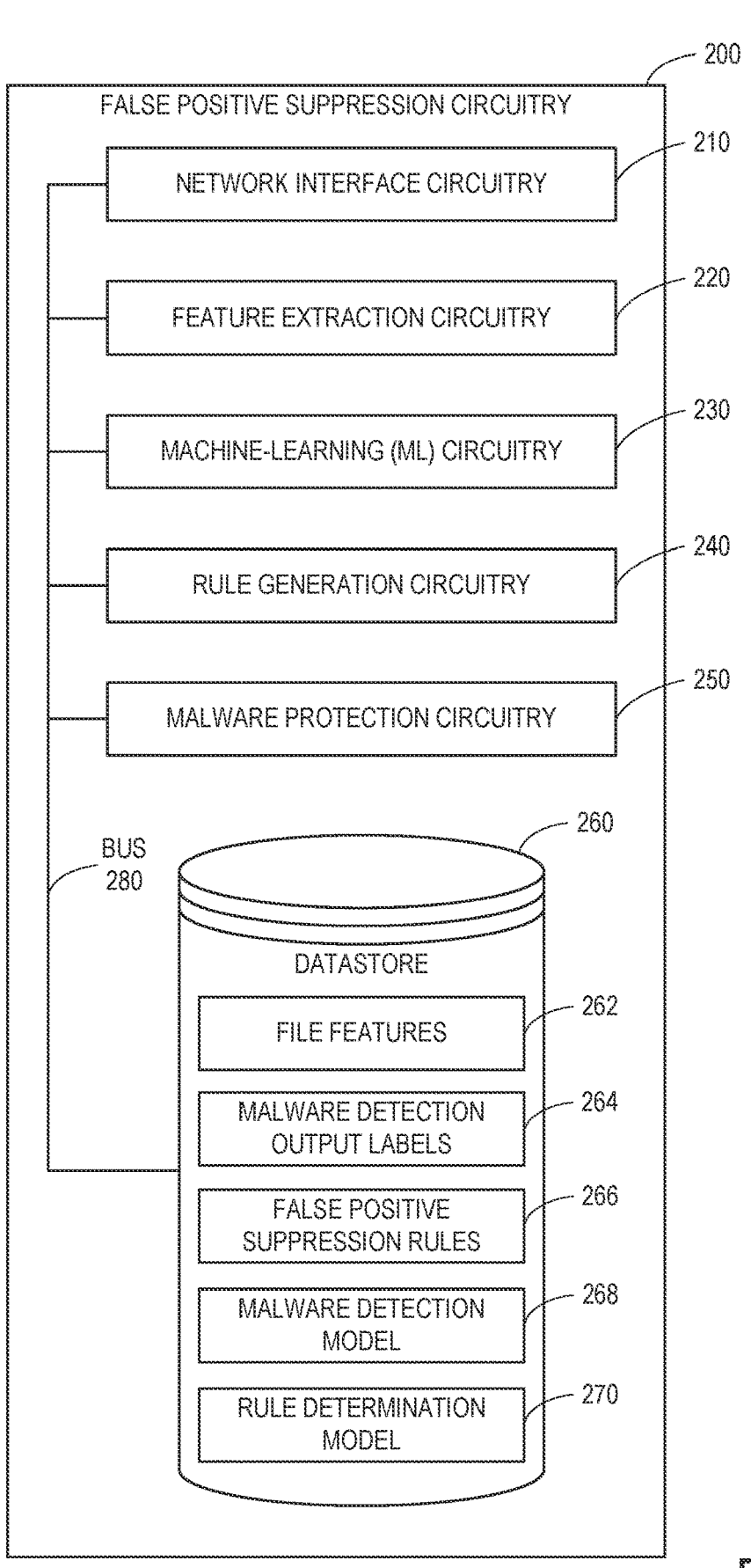
FIG. 2 is a block diagram of an example implementation of the example false positive suppressor of FIG. 1.

FIG. 2 is a block diagram of example false positive suppression circuitry 200 to reduce false positive detections of malware. In some examples, the first FPS circuitry 102, the second FPS circuitry 104, and/or the third FPS circuitry 106 of FIG. 1 can be implemented by the false positive suppression circuitry 200 of FIG. 2. The false positive suppression circuitry 200 of FIG. 2 may be instantiated (e.g., creating an instance of, bring into being for any length of time, materialize, implement, etc.) by processor circuitry such as a central processing unit executing instructions. Additionally or alternatively, the false positive suppression circuitry 200 of FIG. 2 may be instantiated (e.g., creating an instance of, bring into being for any length of time, materialize, implement, etc.) by an ASIC or an FPGA structured to perform operations corresponding to the instructions. It should be understood that some or all of the false positive suppression circuitry 200 of FIG. 2 may, thus, be instantiated at the same or different times. Some or all of the false positive suppression circuitry 200 of FIG. 2 may be instantiated, for example, in one or more threads executing concurrently on hardware and/or in series on hardware. Moreover, in some examples, some or all of the false positive suppression circuitry 200 of FIG. 2 may be implemented by microprocessor circuitry executing instructions to implement one or more virtual machines and/or containers.

The false positive suppression circuitry 200 includes example network interface circuitry 210, example feature extraction circuitry 220, example machine-learning circuitry 230, example rule generation circuitry 240, example malware protection circuitry 250, an example datastore 260, and an example bus 280. The datastore 260 includes example file features 262, example malware detection output labels 264, example false positive suppression rules 266, an example malware detection model 268, and an example rule determination model 270. In the illustrated example of FIG. 2, the network interface circuitry 210, the feature extraction circuitry 220, the machine-learning circuitry 230, the rule generation circuitry 240, the malware protection circuitry 250, and/or the datastore 260 is/are in communication with one(s) of each other via the bus 280. For example, the bus 280 can be implemented by at least one of an Inter-Integrated Circuit (I2C) bus, a Serial Peripheral Interface (SPI) bus, a Peripheral Component Interconnect (PCI) bus, or a Peripheral Component Interconnect Express (PCIe or PCIE) bus. Additionally or alternatively, the bus 280 can be implemented by any other type of computing or electrical bus.

The false positive suppression circuitry 200 of FIG. 2 includes the network interface circuitry 210 to obtain and/or transmit data. In some examples, the network interface circuitry 210 is instantiated by processor circuitry executing network interface instructions and/or configured to perform operations such as those represented by one(s) of the flowcharts of FIGS. 5-8.

In some examples, the network interface circuitry 210 can transmit and/or cause transmission of data, such as the files 120, 122, the PE files 124, 126, telemetry data associated with the endpoint devices 110, 112, etc., to another device or logical entity, such as one(s) of the endpoint devices 110, 112 and/or the central facility 108 via the network 116. In some examples, the network interface circuitry 210 can transmit the file features 262, the malware detection output labels 264, the false positive suppression rules 266, the malware detection model 268, and/or the rule determination model 270 to a logical entity, such as from the first FPS 102 to one(s) of the second FPS 104 and/or the third FPS 106.

The false positive suppression circuitry 200 of FIG. 2 includes the feature extraction circuitry 220 to extract and/or identify the file features 262 of a file, such as the PE files 124, 126 of FIG. 1, and/or, more generally, the files 120, 122 of FIG. 1. In some examples, the feature extraction circuitry 220 is instantiated by processor circuitry executing feature extraction instructions and/or configured to perform operations such as those represented by one(s) of the flowcharts of FIGS. 5-8. In some examples, the feature extraction circuitry 220 can extract and/or identify the file features 262 such as headers, OEM identifiers, stub programs and relocation tables, section headers, image pages, machine data fields, characteristics data fields, OS-specific header data fields, OS subsystem data fields, DLL characteristics, a file size, a byte entropy, a number of comments, etc.

The false positive suppression circuitry 200 of FIG. 2 includes the machine-learning circuitry 230 to execute and/or instantiate the malware detection model 268 to generate outputs representative of classifications of files as malware or non-malware. In some examples, the machine-learning circuitry 230 executes and/or instantiates the rule determination model 270 to generate outputs representative of the false positive suppression rules 266. In some examples, the machine-learning circuitry 230 is instantiated by processor circuitry executing machine-learning instructions and/or configured to perform operations such as those represented by one(s) of the flowcharts of FIGS. 5-8.

Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the malware detection model 268 and/or the rule determination model 270 may be trained with data to recognize patterns and/or associations and follow such patterns and/or associations when processing input data such that other input(s) result in output(s) consistent with the recognized patterns and/or associations.

Many different types of machine-learning models and/or machine-learning architectures exist. In some examples, the ML circuitry 230 generates the malware detection model 268 as a neural network model. In some examples, the ML circuitry 230 generates the rule determination model 270 as a rulefit model. For example, the rulefit model can be implemented as a two-stage model (e.g., a two-stage rulefit model). In some examples, the first stage of the two-stage model can be implemented by a tree-based model (e.g., a tree-based classification model) that outputs trees (e.g., decision trees). In some examples, the second stage of the two-stage model can be a linear model that is applied to branches of the trees to identify important or highly relevant ones of the trees (e.g., to determine which branch(es) drives most of the classification discrimination of the malware detection model 268). The ML circuitry 230 may invoke the network interface circuitry 210 to transmit the malware detection model 268 and/or the rule determination model 270 to one(s) of the endpoint devices 110, 112. Using a neural network model enables the endpoint devices 110, 112 to execute an AI/ML workload. In general, machine-learning models/architectures that are suitable to use in the example approaches disclosed herein include recurrent neural networks. However, other types of machine learning models could additionally or alternatively be used such as supervised learning ANN models, clustering models, classification models, etc., and/or a combination thereof. Example supervised learning ANN models may include two-layer (2-layer) radial basis neural networks (RBN), learning vector quantization (LVQ) classification neural networks, etc. Example clustering models may include k-means clustering, hierarchical clustering, mean shift clustering, density-based clustering, etc. Example classification models may include logistic regression, support-vector machine or network, Naive Bayes, etc. In some examples, the ML circuitry 230 may compile and/or otherwise generate one(s) of the malware detection model 268 and/or the rule determination model 270 as lightweight ML models.

In general, implementing an ML/AI system involves two phases, a learning/training phase and an inference phase. In the learning/training phase, a training algorithm is used to train the malware detection model 268 and/or the rule determination model 270 to operate in accordance with patterns and/or associations based on, for example, training data. In general, the malware detection model 268 and/or the rule determination model 270 include(s) internal parameters that guide how input data is transformed into output data, such as through a series of nodes and connections within the malware detection model 268 and/or the rule determination model 270 to transform input data into output data. Additionally, hyperparameters can be used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, the ML circuitry 230 may invoke supervised training to use inputs and corresponding expected (e.g., labeled) outputs to select parameters (e.g., by iterating over combinations of select parameters) for the malware detection model 268 and/or the rule determination model 270 that reduce model error. As used herein, "labeling" refers to an expected output of the machine learning model (e.g., a classification, an expected output value, etc.).

In some examples, the ML circuitry 230 can train the malware detection model 268 using files, PE files, etc., such as the files 120, 122, the PE files 124, 126, etc., and corresponding malware detection labels as training data. For example, the malware detection labels can include a malware label, a not malware or non-malware label, a true positive malware detection label, a true negative malware detection label, a false positive malware detection label, or a false negative malware detection label.

In some examples, the ML circuitry 230 can train the rule determination model 270 using the file features 262 of files/PE files and corresponding false positive malware detection labels as training data and/or model inputs. For example, the ML circuitry 230 can train the rule determination model 270 using the file features 262 of the first PE file 124 and a false positive malware detection label as training data. For example, the malware detection model 268 can output a malware label on the first PE file 124 based on the first PE file 124 as an input and feedback (e.g., user feedback, automated feedback, etc.) can correct the malware label to be a non-malware label and, thus, generate a data association of a false positive malware detection label and the file features 262 of the first PE file 124.

Alternatively, the ML circuitry 230 may invoke unsupervised training (e.g., used in deep learning, a subset of machine learning, etc.) that involves inferring patterns from inputs to select parameters for the malware detection model 268 and/or the rule determination model 270 (e.g., without the benefit of expected (e.g., labeled) outputs). In some examples, the ML circuitry 230 trains the malware detection model 268 and/or the rule determination model 270 using unsupervised clustering of operating observables. For example, the operating observables may include the file features 262, the malware detection output labels 264, etc. However, the ML circuitry 230 may additionally or alternatively use any other training algorithm such as stochastic gradient descent, Simulated Annealing, Particle Swarm Optimization, Evolution Algorithms, Genetic Algorithms, Nonlinear Conjugate Gradient, etc.

In some examples, the ML circuitry 230 may train the malware detection model 268 and/or the rule determination model 270 until the level of error is no longer reducing. In some examples, the ML circuitry 230 may train the malware detection model 268 and/or the rule determination model 270 locally (e.g., locally at the central facility 108, locally at one(s) of the endpoint devices 110, 112, etc.) and/or remotely at an external computing system communicatively coupled to a local computing system. In some examples, the ML circuitry 230 trains the malware detection model 268 and/or the rule determination model 270 using hyperparameters that control how the learning is performed (e.g., a learning rate, a number of layers to be used in the machine learning model, etc.). In some examples, the ML circuitry 230 may use hyperparameters that control model performance and training speed such as the learning rate and regularization parameter(s). The ML circuitry 230 may select such hyperparameters by, for example, trial and error to reach an optimal model performance. In some examples, the ML circuitry 230 utilizes Bayesian hyperparameter optimization to determine an optimal and/or otherwise improved or more efficient network architecture to avoid model overfitting and improve the overall applicability of the malware detection model 268 and/or the rule determination model 270. Alternatively, the ML circuitry 230 may use any other type of optimization. In some examples, the ML circuitry 230 may perform re-training. The ML circuitry 230 may execute such re-training in response to override(s) by a user of the FPS 102, 104, 106, a receipt of new training data, etc.

In some examples, the ML circuitry 230 facilitates the training of the malware detection model 268 and/or the rule determination model 270 using training data. In some examples, the ML circuitry 230 utilizes training data that originates from locally generated data, such as the file features 262, the malware detection output labels 264, etc. In some examples, the ML circuitry 230 utilizes training data that originates from externally generated data, such as telemetry data associated with the endpoint devices 110, 112. In some examples where supervised training is used, the ML circuitry 230 may label the training data (e.g., label training data or portion(s) thereof as benign or malicious, malware or not malware, etc.). Labeling is applied to the training data by a user manually or by an automated data pre-processing system. In some examples, the ML circuitry 230 may pre-process the training data using, for example, an interface (e.g., the network interface circuitry 210) to determine telemetry data from the endpoint devices 110, 112, a data extractor (e.g., the feature extraction circuitry 220) to extract and/or identify the file features 262, etc. In some examples, the ML circuitry 230 sub-divides the training data into a first portion of data for training the malware detection model 268 and/or the rule determination model 270, and a second portion of data for validating the malware detection model 268 and/or the rule determination model 270.

Once training is complete, the ML circuitry 230 may deploy the malware detection model 268 and/or the rule determination model 270 for use as an executable construct that processes an input and provides an output based on the network of nodes and connections defined in the malware detection model 268 and/or the rule determination model 270. The ML circuitry 230 may store the malware detection model 268 and/or the rule determination model 270 in the datastore 260. In some examples, the ML circuitry 230 may invoke the network interface circuitry 210 to transmit the false positive suppression rules 266, the malware detection model 268, and/or the rule determination model 270 to one(s) of the endpoint devices 110, 112. In some such examples, in response to transmitting the false positive suppression rules 266, the malware detection model 268, and/or the rule determination model 270 to the one(s) of the endpoint devices 110, 112, the one(s) of the endpoint devices 110, 112 may execute the false positive suppression rules 266, the malware detection model 268, and/or the rule determination model 270 to execute AI/ML workloads with at least one of improved efficiency or performance.

Once trained, the deployed one(s) of the malware detection model 268 and/or the rule determination model 270 may be operated in an inference phase to process data. In the inference phase, data to be analyzed (e.g., live data) is input to the malware detection model 268 and/or the rule determination model 270, and the malware detection model 268 and/or the rule determination model 270 execute(s) to create an output. This inference phase can be thought of as the AI "thinking" to generate the output based on what it learned from the training (e.g., by executing the malware detection model 268 and/or the rule determination model 270 to apply the learned patterns and/or associations to the live data). In some examples, input data undergoes pre-processing before being used as an input to the malware detection model 268 and/or the rule determination model 270. Moreover, in some examples, the output data may undergo post-processing after it is generated by the malware detection model 268 and/or the rule determination model 270 to transform the output into a useful result (e.g., a display of data, a detection and/or identification of an object, an instruction to be executed by a machine, etc.).

In some examples, output of the deployed one(s) of the malware detection model 268 and/or the rule determination model 270 may be captured and provided as feedback. By analyzing the feedback, an accuracy of the deployed one(s) of the malware detection model 268 and/or the rule determination model 270 can be determined. If the feedback indicates that the accuracy of the deployed model is less than a threshold or other criterion, training of an updated model can be triggered using the feedback and an updated training data set, hyperparameters, etc., to generate an updated, deployed model.

The false positive suppression circuitry 200 of FIG. 2 includes the rule generation circuitry 240 to execute and/or instantiate the rule determination model 270 to generate output(s), which can include one(s) of the false positive suppression rules 266. In some examples, the rule generation circuitry 240 is instantiated by processor circuitry executing rule generation instructions and/or configured to perform operations such as those represented by one(s) of the flowcharts of FIGS. 5-8.

In some examples, the rule generation circuitry 240 can execute and/or instantiate the rule determination model 270 using the file features 262 and/or the malware detection output labels 264 as inputs (e.g., model inputs) to generate outputs (e.g., model outputs), which can include the false positive suppression rules 266. For example, the rule generation circuitry 240 can execute and/or instantiate the rule determination model 270 to generate trees (e.g., decision trees); analyze the trees; and determine which branch(es) of the trees is/are highly discriminatory, conclusory, definitive, etc., of whether a file, or portion thereof (e.g., a PE file), can cause the malware detection model 268 to output a false positive detection of malware.

The false positive suppression circuitry 200 of FIG. 2 includes the malware protection circuitry 250 to carry out, execute, and/or perform a malware protection and/or mitigation operation. In some examples, the malware protection circuitry 250 is instantiated by processor circuitry executing malware protection instructions and/or configured to perform operations such as those represented by one(s) of the flowcharts of FIGS. 5-8. In some examples, the malware protection circuitry 250 can execute a malware protection operation such as quarantining a file, preventing a file from being executed, halting execution of a file, deleting a file from memory or storage, sandboxing a file, generating and/or propagating an alert representative of a detection of malware to other endpoint devices on a network, etc., and/or any combination(s) thereof.

In the illustrated example of FIG. 2, the false positive suppression circuitry 200 includes the datastore 260 to record data, such as the file features 262, the malware detection output labels 264, the false positive suppression rules 266, the malware detection model 268, and the rule determination model 270. In some examples, the datastore 260 is instantiated by processor circuitry executing datastore instructions and/or configured to perform operations such as those represented by one(s) of the flowcharts of FIGS. 5-8.

The datastore 260 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The datastore 260 may additionally or alternatively be implemented by one or more double data rate (DDR) memories, such as DDR, DDR2, DDR3, DDR4, DDR5, mobile DDR (mDDR), DDR SDRAM, etc. The datastore 260 may additionally or alternatively be implemented by one or more mass storage devices such as hard disk drive(s) (HDD(s)), compact disk (CD) drive(s), digital versatile disk (DVD) drive(s), solid-state disk (SSD) drive (s), Secure Digital (SD) card(s), CompactFlash (CF) card(s), etc. While in the illustrated example the datastore 260 is illustrated as a single datastore, the datastore 260 may be implemented by any number and/or type(s) of datastores. Furthermore, the data stored in the datastore 260 may be in any data format such as, for example, binary data, comma delimited data, a database, a tab delimited data, structured query language (SQL) structures, etc. The term "database" as used herein means an organized body of related data, regardless of the manner in which the data or the organized body thereof is represented. For example, the organized body of related data may be in the form of one or more of a table, a map, a grid, a packet, a datagram, a frame, a file, an e-mail, a message, a document, a report, a list or in any other form.

While an example manner of implementing the first FPS 102, the second FPS 104, and/or the third FPS 106 of FIG. 1 is illustrated in FIG. 2, one or more of the elements, processes, and/or devices illustrated in FIG. 2 may be combined, divided, re-arranged, omitted, eliminated, and/or implemented in any other way. Further, the network interface circuitry 210, the feature extraction circuitry 220, the machine-learning circuitry 230, the rule generation circuitry 240, the malware protection circuitry 250, and/or the datastore 260 and/or, more generally, the first FPS 102, the second FPS 104, and/or the third FPS 106 of FIG. 1, may be implemented by hardware alone or by hardware in combination with software and/or firmware. Thus, for example, any of the network interface circuitry 210, the feature extraction circuitry 220, the machine-learning circuitry 230, the rule generation circuitry 240, the malware protection circuitry 250, and/or the datastore 260, and/or, more generally, the first FPS 102, the second FPS 104, and/or the third FPS 106 could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the first FPS 102, the second FPS 104, and/or the third FPS 106 of FIG. 1 may include one or more elements, processes, and/or devices in addition to, or instead of, those illustrated in FIG. 2, and/or may include more than one of any or all of the illustrated elements, processes and devices.

Figure 3:
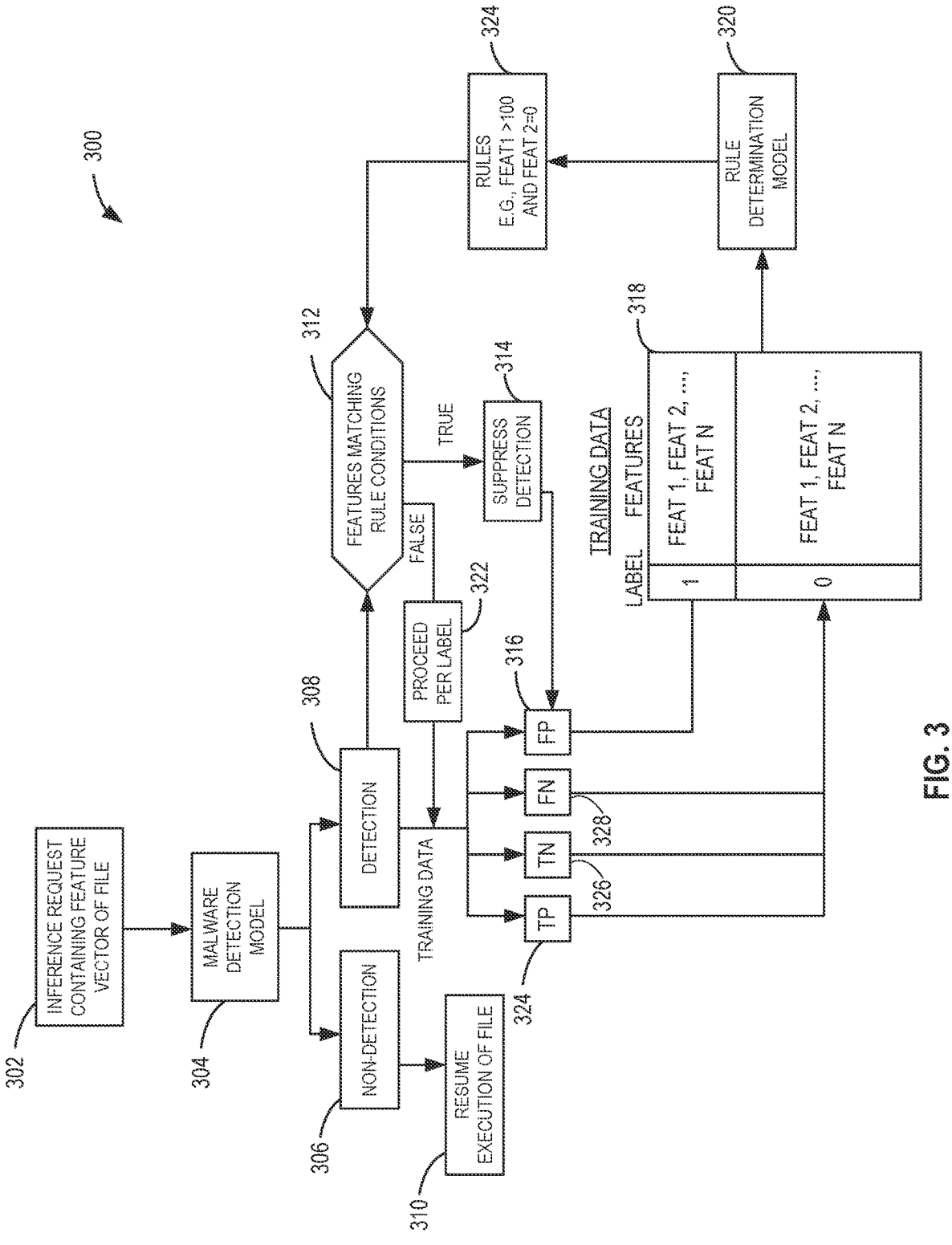
FIG. 3 is an illustration of an example workflow to reduce false positive outputs from a machine-learning model for malware detection.

FIG. 3 is an illustration of an example workflow 300 to reduce false positive outputs from a machine-learning model for malware detection. The workflow 300 begins at a first example operation 302, at which an inference request containing a feature vector is received. For example, the network interface circuitry 210 of FIG. 2 can receive a request (e.g., a request from the endpoint devices 110, 112) for an ML inference operation to determine whether a file, such as the first file 120 contains and/or is associated with malware. In some examples, the request includes a vector of a plurality of the file features 262 of FIG. 2 that correspond to the first file 120.

At a second example operation 304 of the workflow 300, a malware detection model can use the feature vector as input(s) to generate a first example output 306 or a second example output 308. In some examples, the malware detection model of FIG. 3 can be implemented by the malware detection model 268 of FIG. 2. For example, the ML circuitry 230 of FIG. 2 can execute and/or instantiate the malware detection model 268 based on the feature vector to generate the first output 306 as a non-detection malware detection output. The non-detection malware output can be representative of a determination by the malware detection model that the first file 120 is not (or is unlikely to be) malware. In some examples, the ML circuitry 230 can execute and/or instantiate the malware detection model 268 based on the feature vector to generate the second output 308 as a detection malware detection output. The detection malware detection output can be representative of a determination by the malware detection model that the first file 120 is (or is likely to be) malware. In response to a non-detection of malware, the workflow 300 proceeds to a third example operation 310 that is representative of resuming execution of the first file 120.

In response to a detection of malware, the workflow 300 proceeds to a fourth example operation 312 that is representative of determining whether the detection of malware is a false positive detection of malware. For example, at the fourth operation 312, the ML circuitry 230 can determine whether one(s) of the file features 262 of FIG. 2 of the feature vector match, partially match, and/or otherwise invoke or trigger one(s) of the false positive suppression rules 266 of FIG. 2.

If, at the fourth operation 312, one(s) of the file features 262 of the feature vector match, partially match, and/or otherwise invoke or trigger one(s) of the false positive suppression rules 266 of FIG. 2 (identified by TRUE in FIG. 3), the workflow 300 proceeds to a fifth example operation 314 to suppress the malware detection and/or the association of malware and the first file 120. For example, the workflow 300 can proceed to resume execution of the first file 120. After suppressing the detection at the fifth operation 314, the workflow 300 outputs a data association of the file features 262 of the first file 120 and an example false positive (identified by FP) malware detection label 316 to indicate that the detection of malware at the second output 308 is erroneous. For example, the false positive malware detection label 316 and the file features 262 of the first file 120 can be used as example training data 318 for an example rule determination model 320.

If, at the fourth operation 312, one(s) of the file features 262 of the feature vector do not match, partially match, and/or otherwise invoke or trigger one(s) of the false positive suppression rules 266 of FIG. 2 (identified by FALSE in FIG. 3), the workflow 300 proceeds to a sixth example operation 322 to proceed per the label output from the malware detection model. For example, after a determination that the first file 120 is likely to be malware, then the malware protection software 118 of FIG. 1 can execute one or more malware protection operations.

In the workflow 300 of FIG. 3, training data associated with the outputs from the malware detection model can be used to rain the rule determination model 320. In some examples, the rule determination model 320 can be implemented by the rule determination model 270 of FIG. 2. For example, the workflow 300 can output and/or provide data associations of ones of the file features 262 and corresponding malware detection labels 316, 324, 326, 328. The malware detection labels 316, 324, 326, 328 include the false positive malware detection label 316, a true positive (TP) malware detection label 324, a true negative (TN) malware detection label 326, and a false negative (FN) malware detection label 328. For example, the training data can include data associations of 1 or true with one(s) of the file features 262 that caused the malware detection model to output false positive malware detection labels. In some examples, the training data can include data associations of 0 or false with one(s) of the file features 262 that caused the malware detection model to output true positive, true negative, or false negative malware detection labels.

The workflow 300 trains, executes, and/or instantiates the rule determination model 320 to determine, generate, and/or output example false positive suppression rules 324. In some examples, the false positive suppression rules 324 can be implemented by the false positive suppression rules 266 of FIG. 2. After the false positive suppression rules 324 are generated, they can be deployed to be used to determine whether features of file feature vectors match, partially match, and/or otherwise invoke rule conditions set forth and/or defined by the false positive suppression rules 324.

FIG. 4 is a table 400 of example false positive samples 402 and corresponding example features 404. For example, the false positive samples 402 can be files that, when analyzed, scanned, etc., by the malware detection model 268 of FIG. 2 and/or the malware detection model of the second operation 304 of FIG. 3 for malicious and/or malware characteristics, causes the malware detection model 268 of FIG. 2 and/or the malware detection model of the second operation 304 of FIG. 3 to output a false positive detection of malware. In some examples, false positive sample 1 (identified by FALSE POSITIVE SAMPLE 1) can be implemented by the first PE file 124 and/or, more generally, the first file 120 of FIG. 1. In some examples, false positive sample 2 (identified by FALSE POSITIVE SAMPLE 2) can be implemented by the second PE file 126 and/or, more generally, the second file 122 of FIG. 1. For example, the malware detection output labels of FALSE POSITIVE SAMPLE 1 and FALSE POSITIVE SAMPLE 2 can implement the false positive malware detection label 316 of FIG. 3.

The features 404 of FIG. 4 are representative of a variety and/or range of features, such as features of executable files, that may be associated with causing false positive detections of malware. For example, the features 404 include a first feature (identified by FEATURE 1) that can be a size of a file (e.g., a file size). In some examples, the features 404 include a second feature (identified by FEATURE 2) that can be a specified value of a machine data field. Alternatively, the features 404 may include and/or be representative of any feature as described herein.

By way of example, the false positive sample 1 of the false positive samples 402 can be the first PE file 124 of FIG. 1. By way of example, features 1 through feature N can be the file features 262 of FIG. 2, the feature vector of FIG. 3 of the first PE file 124, etc. By way of example, the first PE file 124 can have a value of FALSE for feature 1, a value of TRUE for feature 2, a value of 0x14c for feature 3, and so forth. For example, if feature 1 is a file size of less than 1 Megabyte (MB), then having a value of FALSE refers to the first PE file 124 having a file size of 1 MB or greater. In some examples, if feature 3 is a machine data field with a value (e.g., a hexadecimal value) of 0x14c, which refers to an Intel 386 or later processor by Intel® Corporation of Santa Clara, California and/or compatible processor, then having a value of 0x14c refers to the first PE file 124 including a machine data field that references an Intel 386 or later processor and/or compatible processor.

Flowcharts representative of example machine-readable instructions, which may be executed to configure processor circuitry to implement one(s) of the FPS circuitry 102, 104, 106 of FIG. 1 and/or the false positive suppression circuitry 200 of FIG. 2, are shown in FIGS. 5-8. The machine-readable instructions may be one or more executable programs or portion(s) of an executable program for execution by processor circuitry, such as the processor circuitry 912 shown in the example processor platform 900 discussed below in connection with FIG. 9 and/or the example processor circuitry discussed below in connection with FIGS. 10 and/or 11. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine-readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 5-8, many other methods of implementing one(s) of the FPS circuitry 102, 104, 106 of FIG. 1 and/or the false positive suppression circuitry 200 of FIG. 2 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine-readable instructions described herein may be stored in one or more of a compressed format, an encrypted format, a fragmented format, a compiled format, an executable format, a packaged format, etc. machine-readable instructions as described herein may be stored as data or a data structure (e.g., as portions of instructions, code, representations of code, etc.) that may be utilized to create, manufacture, and/or produce machine executable instructions. For example, the machine-readable instructions may be fragmented and stored on one or more storage devices and/or computing devices (e.g., servers) located at the same or different locations of a network or collection of networks (e.g., in the cloud, in edge devices, etc.). The machine-readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine-readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine-readable instructions may be stored in a state in which they may be read by processor circuitry, but require addition of a library (e.g., a dynamic link library (DLL)), a software development kit (SDK), an application programming interface (API), etc., in order to execute the machine-readable instructions on a particular computing device or other device. In another example, the machine-readable instructions may need to be configured (e.g., settings stored, data input, network addresses recorded, etc.) before the machine-readable instructions and/or the corresponding program(s) can be executed in whole or in part. Thus, machine-readable media, as used herein, may include machine-readable instructions and/or program(s) regardless of the particular format or state of the machine-readable instructions and/or program(s) when stored or otherwise at rest or in transit.

The machine-readable instructions described herein can be represented by any past, present, or future instruction language, scripting language, programming language, etc. For example, the machine-readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 5-8 may be implemented using executable instructions (e.g., computer and/or machine-readable instructions) stored on one or more non-transitory computer and/or machine-readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine-readable medium, and non-transitory machine-readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine-readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine-readable instructions, etc., and/or manufactured to execute computer readable instructions, machine-readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 5:
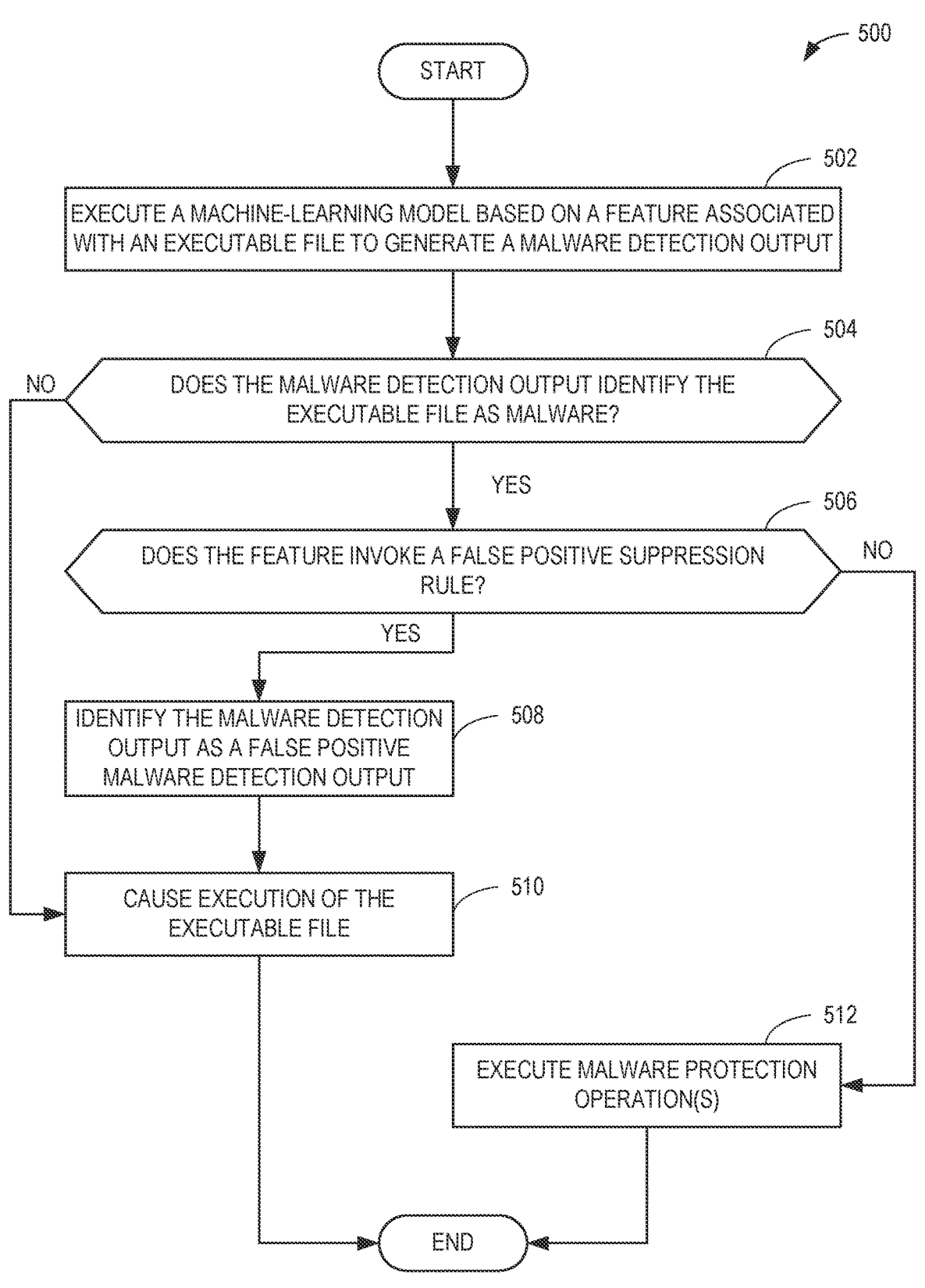
FIG. 5 is a flowchart representative of example machine-readable instructions and/or example operations that may be executed by example processor circuitry to implement the false positive suppressor of FIGS. 1 and/or 2 to reduce false positive outputs from a machine-learning model for malware detection.

FIG. 5 is a flowchart representative of example machine-readable instructions and/or example operations 500 that may be executed and/or instantiated by processor circuitry to reduce false positive outputs from a machine-learning model for malware detection. The example machine-readable instructions and/or the example operations 500 of FIG. 5 begin at block 502, at which the false positive suppression circuitry 200 executes a machine-learning model based on a feature associated with an executable file to generate a malware detection output. For example, the ML circuitry 230 (FIG. 2) can execute and/or instantiate the malware detection model 268 (FIG. 2) using the file features 262 (FIG. 2) of the first PE file 124 of FIG. 1 as inputs to generate output(s), which can include a malware detection output of malware, not malware, etc.

At block 504, the false positive suppression circuitry 200 determines whether the malware detection output identifies the executable file as malware. For example, the ML circuitry 230 can determine that the malware detection output identifies the first PE file 124 as malware.

If, at block 504, the false positive suppression circuitry 200 determines that the malware detection output does not identify the executable file as malware, control proceeds to block 510. Otherwise, control proceeds to block 506.

At block 506, the false positive suppression circuitry 200 determines whether the feature invokes a false positive suppression rule. For example, the ML circuitry 230 can determine whether a first one of the file features 262 of the first PE file 124 matches and/or partially matches a corresponding one of the false positive suppression rules 266 (FIG. 2). In some examples, the ML circuitry 230 can determine that the identification of the first PE file 124 as malware is a true positive detection of malware after a determination that the first one of the file features 262 of the first PE file 124 does not match and/or partially match the corresponding one of the false positive suppression rules 266. In some examples, the ML circuitry 230 can determine that the identification of the first PE file 124 as malware is a false positive detection of malware after a determination that the first one of the file features 262 of the first PE file 124 matches and/or partially matches the corresponding one of the false positive suppression rules 266.

If, at block 506, the false positive suppression circuitry 200 determines that the feature does not invoke a false positive suppression rule, control proceeds to block 512. At block 512, the false positive suppression circuitry 200 executes malware protection operation(s). For example, after a first determination that the first PE file 124 is identified as malware and a second determination that the identification of malware is not a false positive (e.g., is a true positive detection of malware), the malware protection circuitry 250 (FIG. 2) can carry out, execute, and/or perform one or more malware protection operations, such as quarantining the first PE file 124, deleting the first PE file 124 from the first endpoint device 110, preventing and/or halting execution of the first PE file 124, etc., and/or any combination(s) thereof. After executing malware protection operation(s) at block 512, the example machine-readable instructions and/or the example operations 500 of FIG. 5 conclude.

If, at block 506, the false positive suppression circuitry 200 determines that the feature invokes a false positive suppression rule, control proceeds to block 508. At block 508, the false positive suppression circuitry 200 identifies the malware detection output as a false positive malware detection output. For example, the ML circuitry 230 can determine to suppress the false positive detection of malware.

At block 510, the false positive suppression circuitry 200 causes execution of the executable file. For example, after a determination that the detection of malware is a false positive, the ML circuitry 230 can instruct the OS 114 of the first endpoint device 110 to execute and/or resume execution of the first PE file 124. After causing execution of the executable file at block 510, the example machine-readable instructions and/or the example operations 500 of FIG. 5 conclude.

FIG. 6 is a flowchart representative of example machine-readable instructions and/or example operations 600 that may be executed and/or instantiated by processor circuitry to generate false positive suppression rules. The example machine-readable instructions and/or the example operations 600 of FIG. 6 begin at block 602, at which the false positive suppression circuitry 200 executes a machine-learning model on features associated with executable files to generate malware detection outputs. For example, the feature extraction circuitry 220 (FIG. 2) can extract the file features 262 (FIG. 2) from the PE files 124, 126 of FIG. 1. In some examples, the ML circuitry 230 (FIG. 2) can execute and/or instantiate the malware detection model 268 (FIG. 2) on the file features 262 of the PE files 124, 126 of FIG. 1 to generate outputs representative of whether the PE files 124, 126 are malware or not malware.

At block 604, the false positive suppression circuitry 200 identifies first one(s) of the malware detection outputs as false positives. For example, the ML circuitry 230 can obtain feedback, such as feedback from a user (e.g., a human user, an automated user, etc.) and/or an automated software service, that identifies the outputs of the malware detection model 268 as true positive, true negative, false negative, or false positive detections of malware. In some examples, the ML circuitry 230 can determine based on the feedback that a first malware detection output of the first PE file 124 of malware is a false positive detection of malware.

At block 606, the false positive suppression circuitry 200 generates first data associations of the false positives and the features of the false positives. For example, the ML circuitry 230 can generate first data associations of first ones of the file features 262 of the first PE file 124 with a label representative of a false positive detection of malware.

At block 608, the false positive suppression circuitry 200 identifies second one(s) of the malware detection outputs as non-false positives. For example, the ML circuitry 230 can determine based on the feedback that a second malware detection output of the second PE file 126 of malware is a true positive detection of malware and thereby is a non-false positive.

At block 610, the false positive suppression circuitry 200 generates second data associations of the non-false positives and the features of the non-false positives. For example, the ML circuitry 230 can generate second data associations of second ones of the file features 262 of the second PE file 126 with a label representative of a true positive detection of malware.

At block 612, the false positive suppression circuitry 200 executes a rulefit model based on the first data associations and the second data associations to output false positive suppression rules. For example, the rule generation circuitry 240 (FIG. 2) can execute and/or instantiate the rule determination model 270 (FIG. 2) using feature vectors as inputs, which include the first and second data associations, to generate outputs, which can include one(s) of the false positive suppression rules 266 (FIG. 2).

At block 614, the false positive suppression circuitry 200 deploys the false positive suppression rules to suppress detection of false positive malware detection outputs. For example, the rule generation circuitry 240 can invoke, instruct, and/or cause the network interface circuitry 210 (FIG. 2) to transmit and/or cause transmission of the one(s) of the false positive suppression rules 266 to at least one of the first FPS circuitry 102, the second FPS circuitry 104, or the third FPS circuitry 106 of FIG. 1. After deploying the false positive suppression rules to suppress detection of false positive malware detection outputs at block 614, the example machine-readable instructions and/or the example operations 600 of FIG. 6 conclude.

Figure 7:
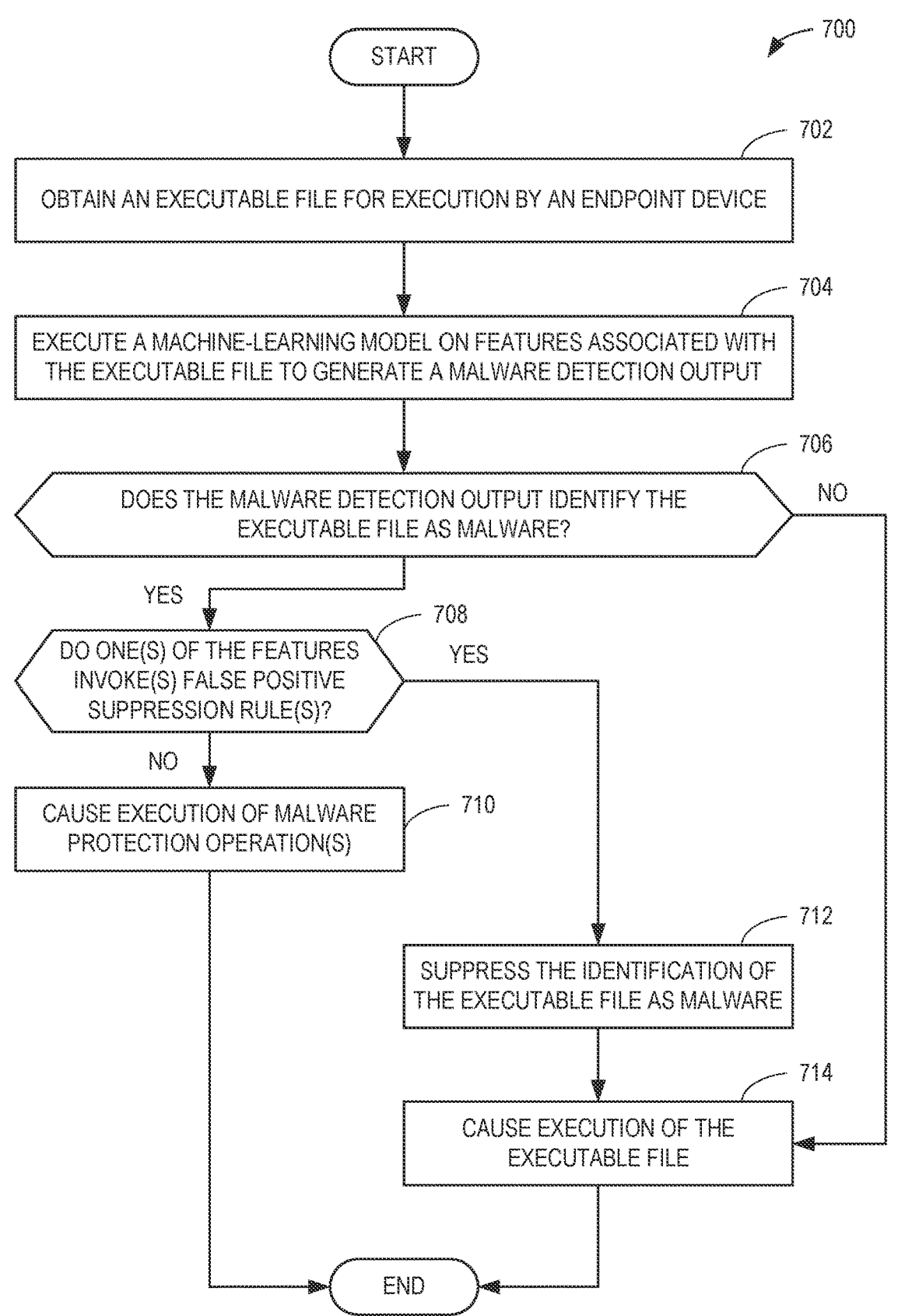
FIG. 7 is a flowchart representative of example machine-readable instructions and/or example operations that may be executed by example processor circuitry to implement the false positive suppressor of FIGS. 1 and/or 2 to protect an endpoint device from malware.

FIG. 7 is a flowchart representative of example machine-readable instructions and/or example operations 700 that may be executed and/or instantiated by processor circuitry to protect an endpoint device from malware. The example machine-readable instructions and/or the example operations 700 of FIG. 7 begin at block 702, at which the false positive suppression circuitry 200 obtains an executable file for execution by an endpoint device. For example, the network interface circuitry 210 (FIG. 2) of the central facility 108 and/or one(s) of the second endpoint devices 112 of FIG. 1 can obtain the first PE file 124, and/or, more generally, the first file 120, from the first endpoint device 110 of FIG. 1.

At block 704, the false positive suppression circuitry 200 executes a machine-learning model on features associated with the executable file to generate a malware detection output. For example, the ML circuitry 230 (FIG. 2) can execute and/or instantiate the malware detection model 268 (FIG. 2) based on the file features 262 (FIG. 2) of the first PE file 124 as inputs to generate output(s), which can include a malware detection output that identifies the first PE file 124 as malware or not malware.

At block 704, the false positive suppression circuitry 200 determines whether the malware detection output identifies the executable file as malware. For example, the ML circuitry 230 can determine that the output from the malware detection model 268 is a label (e.g., an ML label, a malware detection label, a malware detection output label, etc.) of malware.

If, at block 704, the false positive suppression circuitry 200 determines that the malware detection output does not identify the executable file as malware, control proceeds to block 714. If, at block 704, the false positive suppression circuitry 200 determines that the malware detection output identifies the executable file as malware, control proceeds to block 708.

At block 708, the false positive suppression circuitry 200 determines whether one(s) of the features invoke(s) false positive suppression rule(s). For example, the ML circuitry 230 can determine whether one(s) of the file features 262 of the first PE file 124 invoke one(s) of the false positive suppression rules 266 by matching, partially matching, etc., condition(s), requirement(s) and/or stipulation(s) of the one(s) of the false positive suppression rules 266.

If, at block 708, the false positive suppression circuitry 200 determines that one(s) of the features do not invoke false positive suppression rule(s), control proceeds to block 710. At block 710, the false positive suppression circuitry 200 causes execution of malware protection operation(s). For example, after a determination that the malware detection output of malware is not a false positive detection of malware based on the one(s) of the file features 262 of the first PE file 124 not invoking one(s) of the false positive suppression rules 266, the ML circuitry 230 can alert and/or cause the malware protection circuitry 250 to execute one or more malware protection operations, such as sandboxing the first PE file 124 on the first endpoint device 110. In some examples, the ML circuitry 230 of the central facility 108 and/or one(s) of the second endpoint devices 112 can alert and/or cause the malware protection circuitry 250 (and/or the malware protection software 118 of FIG. 1) of the first endpoint device 110 to execute one or more malware protection operations, such as sandboxing the first PE file 124 on the first endpoint device 110. After causing execution of malware protection operation(s) at block 710, the example machine-readable instructions and/or the example operations 700 of FIG. 7 conclude.

If, at block 708, the false positive suppression circuitry 200 determines that one(s) of the features invoke(s) false positive suppression rule(s), control proceeds to block 712. At block 712, the false positive suppression circuitry 200 suppresses the identification of the executable file as malware. For example, the ML circuitry 230 can suppress the false positive detection of malware by alerting the first endpoint device 110 and/or causing the first endpoint device 110 to execute, resume execution of, etc., the first PE file 124.

After suppressing the identification of the executable file as malware at block 712, control proceeds to block 714. At block 714, the false positive suppression circuitry 200 causes execution of the executable file. For example, after the ML circuitry 230 alerts the first endpoint device 110 that the first PE file 124 is not malware, the OS 114 can execute and/or instantiate the first PE file 124 to carry out a workload (e.g., a compute, computing, software, firmware, and/or electronic workload), a function (e.g., a compute, computing, software, firmware, and/or electronic function), a desired operation (e.g., a compute, computing, software, firmware, and/or electronic operation), etc. After causing execution of the executable file at block 714, the example machine-readable instructions and/or the example operations 700 of FIG. 7 conclude.

Figure 8:
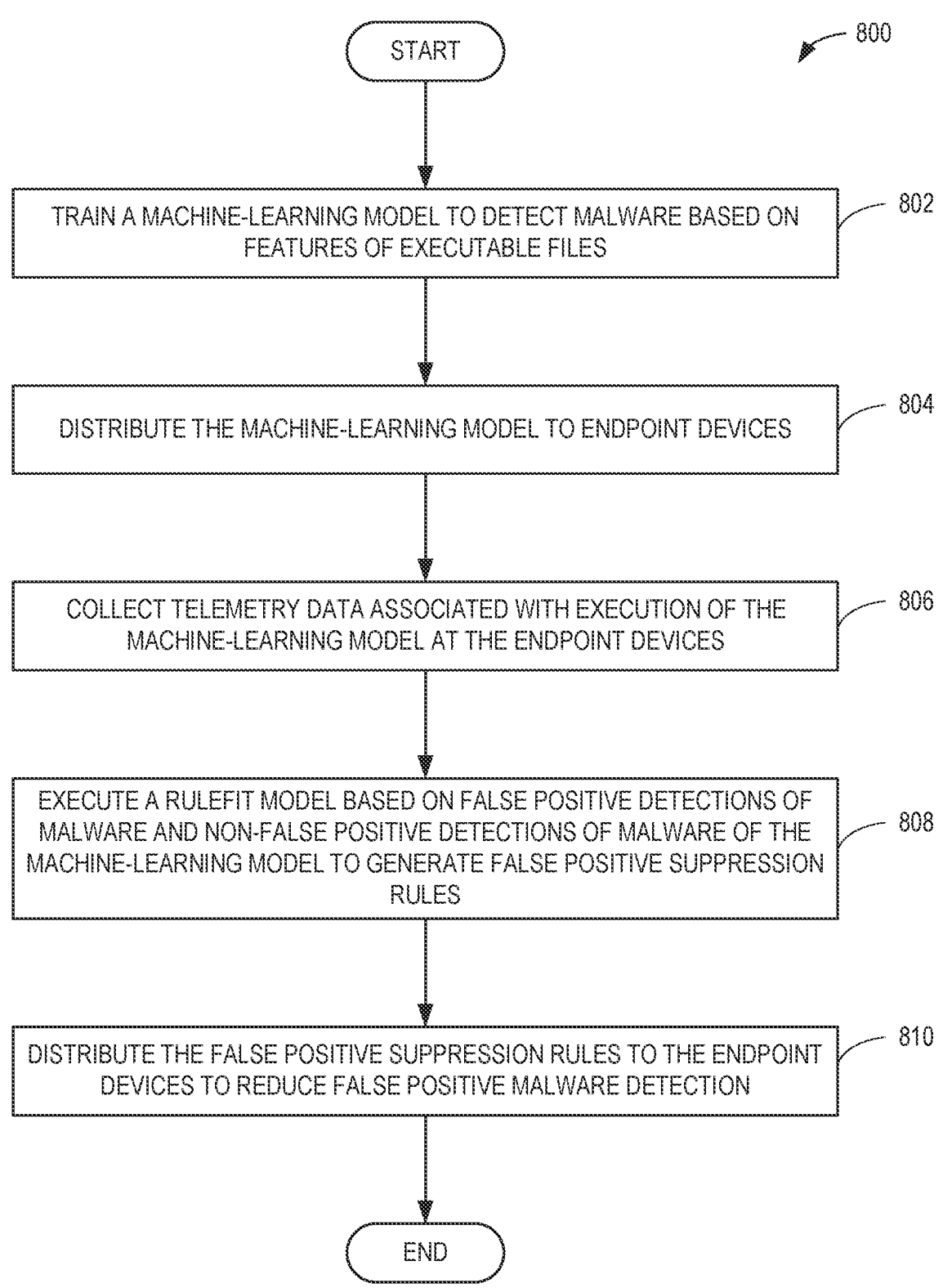
FIG. 8 is a flowchart representative of example machine-readable instructions and/or example operations that may be executed by example processor circuitry to implement the false positive suppressor of FIGS. 1 and/or 2 to distribute false positive suppression rules to endpoint devices.

FIG. 8 is a flowchart representative of example machine-readable instructions and/or example operations 800 that may be executed and/or instantiated by processor circuitry to distribute false positive suppression rules to endpoint devices. The example machine-readable instructions and/or the example operations 800 of FIG. 8 begin at block 802, at which the false positive suppression circuitry 200 trains a machine-learning model to detect malware based on features of executable files. For example, the ML circuitry 230 (FIG. 2) can train an untrained version of the malware detection model 268 (FIG. 2) using the file features 262 of a plurality of files (e.g., executable files) to detect and/or identify malware.

At block 804, the false positive suppression circuitry 200 distributes the machine-learning model to endpoint devices. For example, the network interface circuitry 210 (FIG. 2) can transmit (or cause transmission of) and/or distribute (or cause distribution of) of the trained version of the malware detection model 268 to the central facility 108, the first endpoint device 110, and/or one(s) of the second endpoint devices 112 via the network 116 and/or a direct wired or wireless connection.

At block 806, the false positive suppression circuitry 200 collects telemetry data associated with execution of the machine-learning model at the endpoint devices. For example, the network interface circuitry 210 can obtain telemetry data from the first endpoint device 110 in response to and/or after execution of the malware detection model 268 at the first endpoint device 110. In some examples, the telemetry data can include one(s) of the file features 262 of the first PE file 124, and/or, more generally, the first file 120. In some examples, the telemetry data can include one(s) of the malware detection output labels 264 (FIG. 2) from the malware detection model 268 at the first endpoint device 110. In some examples, the telemetry data can include a version and/or list of the false positive suppression rules 266 utilized by the first endpoint device 110. In some examples, the telemetry data can include aspects or characteristics of the first endpoint device 110, such as a type and/or version of the OS 114, a type and/or version of the malware protection software 118, a type and/or version of the first FPS 102, a type and/or version of hardware (e.g., a type and/or version of processor circuitry, memory, mass storage, etc.) of the first endpoint device 110, etc.

At block 808, the false positive suppression circuitry 200 executes a rulefit model based on false positive detections of malware and non-false positive detections of malware of the machine-learning model to generate false positive suppression rules. For example, the rule generation circuitry 240 (FIG. 2) can execute and/or instantiate the rule determination model 270 (FIG. 2) using the false positive samples 402 of FIG. 4 and the features 404 of FIG. 4 as inputs, which can be included in the received telemetry data, to generate outputs, which can include the false positive suppression rules 266 (FIG. 2).

At block 810, the false positive suppression circuitry 200 distributes the false positive suppression rules to the endpoint devices to reduce false positive malware detection. For example, the network interface circuitry 210 can transmit (or cause transmission of) and/or distribute (or cause distribution of) the false positive suppression rules 266 (or changes or updates to one(s) of the false positive suppression rules 266) to at least one of the central facility 108, the first endpoint device 110, or one(s) of the second endpoint devices 112. After distributing the false positive suppression rules to the endpoint devices to reduce false positive malware detection at block 810, the example machine-readable instructions and/or the example operations 800 of FIG. 8 conclude.

Figure 9:
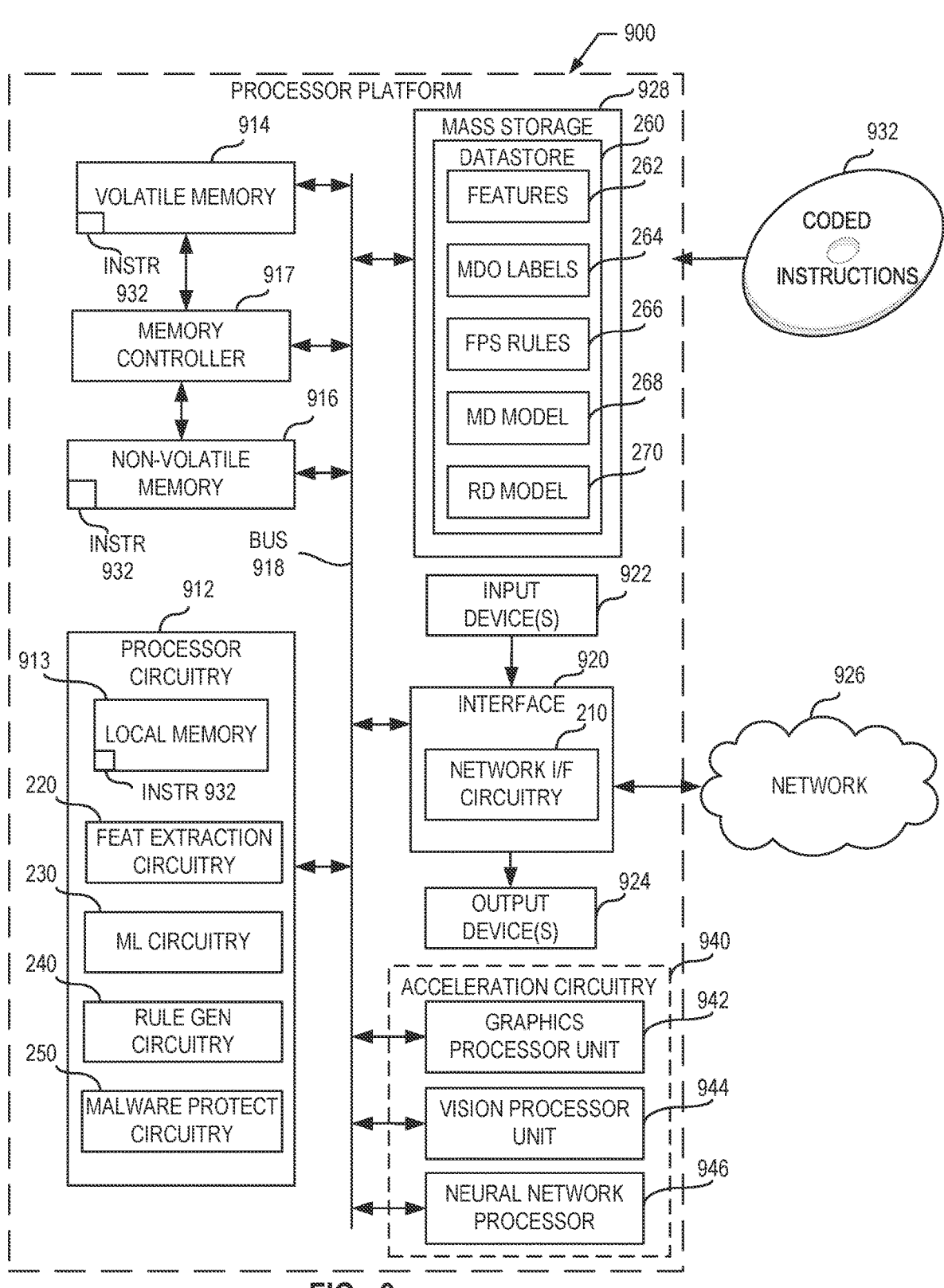
FIG. 9 is a block diagram of an example processing platform including processor circuitry structured to execute the example machine-readable instructions and/or the example operations of FIGS. 5-8 to implement the false positive suppressor of FIGS. 1 and/or 2.

FIG. 9 is a block diagram of an example processor platform 900 structured to execute and/or instantiate the example machine-readable instructions and/or the example operations of FIGS. 5-8 to implement the false positive suppression circuitry 200 of FIG. 2. For example, the processor platform 900 can implement the first FPS circuitry 102 of FIG. 1, and/or, more generally, the central facility 108 of FIG. 1. In some examples, the processor platform 900 can implement the second FPS circuitry 104 of FIG. 1, and/or, more generally, the first endpoint device 110 of FIG. 1. In some examples, the processor platform 900 can implement the third FPS circuitry 106 of FIG. 1, and/or, more generally, respective ones of the second endpoint devices 112 of FIG. 1.

The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a gaming console, a headset (e.g., an augmented reality (AR) headset, a vehicle, an autonomous vehicle, a virtual reality (VR) headset, etc.) or other wearable device, or any other type of computing device.

The processor platform 900 of the illustrated example includes processor circuitry 912. The processor circuitry 912 of the illustrated example is hardware. For example, the processor circuitry 912 can be implemented by one or more integrated circuits, logic circuits, FPGAs, microprocessors, CPUs, GPUs, DSPs, and/or microcontrollers from any desired family or manufacturer. The processor circuitry 912 may be implemented by one or more semiconductor based (e.g., silicon based) devices. In this example, the processor circuitry 912 implements the feature extraction circuitry 220 (identified by FEAT EXTRACTION CIRCUITRY), the ML circuitry 230, the rule generation circuitry 240 (identified by RULE GEN CIRCUITRY), and the malware protection circuitry 250 (identified by MALWARE PROTECT CIRCUITRY) of FIG. 2.

The processor circuitry 912 of the illustrated example includes a local memory 913 (e.g., a cache, registers, etc.). The processor circuitry 912 of the illustrated example is in communication with a main memory including a volatile memory 914 and a non-volatile memory 916 by a bus 918. In some examples, the bus 918 can implement the bus 280 of FIG. 2. The volatile memory 914 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 916 may be implemented by flash memory and/or any other desired type of memory device. Access to the main memory 914, 916 of the illustrated example is controlled by a memory controller 917.

The processor platform 900 of the illustrated example also includes interface circuitry 920. In this example, the interface circuitry 920 implements the network interface circuitry 210 (identified by NETWORK I/F CIRCUITRY) of FIG. 2. The interface circuitry 920 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 922 are connected to the interface circuitry 920. The input device(s) 922 permit(s) a user to enter data and/or commands into the processor circuitry 912. The input device(s) 922 can be implemented by, for example, an audio sensor, a microphone, a camera (still or video), a keyboard, a button, a mouse, a touchscreen, a track-pad, a trackball, an isopoint device, and/or a voice recognition system.

One or more output devices 924 are also connected to the interface circuitry 920 of the illustrated example. The output device(s) 924 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 920 of the illustrated example, thus, typically includes a graphics driver card, a graphics driver chip, and/or graphics processor circuitry such as a GPU.

The interface circuitry 920 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 926. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 900 of the illustrated example also includes one or more mass storage devices 928 to store software and/or data. Examples of such mass storage devices 928 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives. In this example, the one or more mass storage devices 928 implement the datastore 260, the file features 262 (identified by FEATURES), the malware detection output labels 264 (identified by MDO LABELS), the false positive suppression rules 266 (identified by FPS RULES), the malware detection model 268 (identified by MD MODEL), and the rule determination model 270 (identified by RD MODEL) of FIG. 2.

The machine-readable instructions 932, which may be implemented by the machine-readable instructions of FIGS. 5-8, may be stored in the mass storage device 928, in the volatile memory 914, in the non-volatile memory 916, and/or on a removable non-transitory computer readable storage medium such as a CD or DVD.

The processor platform 900 of the illustrated example of FIG. 9 includes example acceleration circuitry 940, which includes an example graphics processing unit (GPU) 942, an example vision processing unit (VPU) 944, and an example neural network processor 946. In this example, the GPU 942, the VPU 944, and the neural network processor 946 are in communication with different hardware of the processor platform 900, such as the volatile memory 914, the non-volatile memory 916, etc., via the bus 918. In this example, the neural network processor 946 may be implemented by one or more integrated circuits, logic circuits, microprocessors, GPUs, DSPs, or controllers from any desired family or manufacturer that can be used to execute an AI model, such as a neural network, which may be implemented by the malware detection model 268 and/or the rule determination model 270. In some examples, one or more of the feature extraction circuitry 220, the ML circuitry 230, the rule generation circuitry 240, and/or the malware protection circuitry 250 can be implemented in or with at least one of the GPU 942, the VPU 944, or the neural network processor 946 instead of or in addition to the processor circuitry 912.

Figure 10:
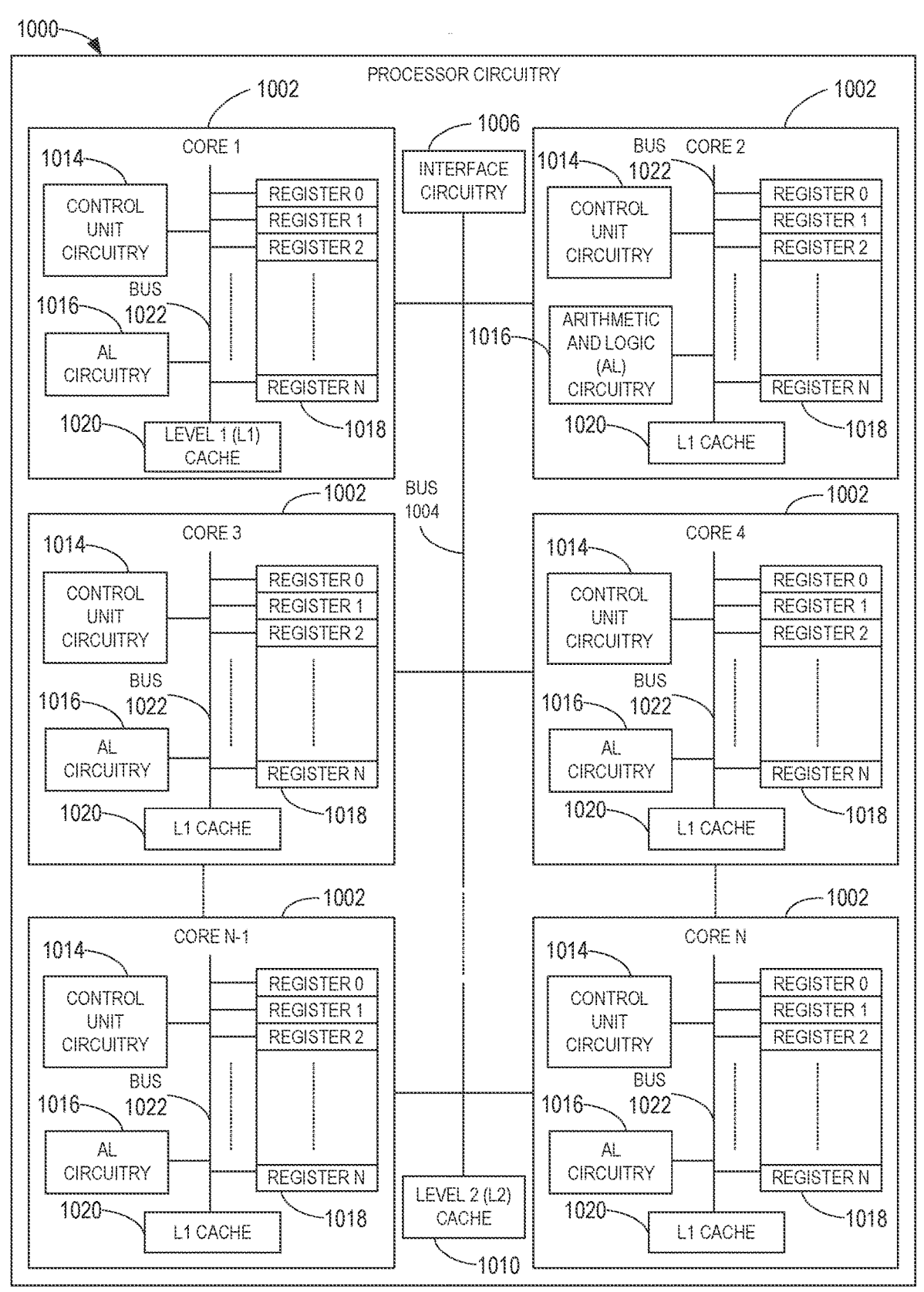
FIG. 10 is a block diagram of an example implementation of the processor circuitry of FIG. 9.

FIG. 10 is a block diagram of an example implementation of the processor circuitry 912 of FIG. 9. In this example, the processor circuitry 912 of FIG. 9 is implemented by a microprocessor 1000. For example, the microprocessor 1000 may be a general purpose microprocessor (e.g., general purpose microprocessor circuitry). The microprocessor 1000 executes some or all of the machine-readable instructions of the flowcharts of FIGS. 5-8 to effectively instantiate the false positive suppression circuitry 200 of FIG. 2 as logic circuits to perform the operations corresponding to those machine-readable instructions. In some such examples, the false positive suppression circuitry 200 of FIG. 2 is instantiated by the hardware circuits of the microprocessor 1000 in combination with the instructions. For example, the microprocessor 1000 may be implemented by multi-core hardware circuitry such as a CPU, a DSP, a GPU, an XPU, etc. Although it may include any number of example cores 1002 (e.g., 1 core), the microprocessor 1000 of this example is a multi-core semiconductor device including N cores. The cores 1002 of the microprocessor 1000 may operate independently or may cooperate to execute machine-readable instructions. For example, machine code corresponding to a firmware program, an embedded software program, or a software program may be executed by one of the cores 1002 or may be executed by multiple ones of the cores 1002 at the same or different times. In some examples, the machine code corresponding to the firmware program, the embedded software program, or the software program is split into threads and executed in parallel by two or more of the cores 1002. The software program may correspond to a portion or all of the machine-readable instructions and/or operations represented by the flowcharts of FIGS. 5-8.

The cores 1002 may communicate by a first example bus 1004. In some examples, the first bus 1004 may be implemented by a communication bus to effectuate communication associated with one(s) of the cores 1002. For example, the first bus 1004 may be implemented by at least one of an Inter-Integrated Circuit (I2C) bus, a Serial Peripheral Interface (SPI) bus, a PCI bus, or a PCIe bus. Additionally or alternatively, the first bus 1004 may be implemented by any other type of computing or electrical bus. The cores 1002 may obtain data, instructions, and/or signals from one or more external devices by example interface circuitry 1006. The cores 1002 may output data, instructions, and/or signals to the one or more external devices by the interface circuitry 1006. Although the cores 1002 of this example include example local memory 1020 (e.g., Level 1 (L1) cache that may be split into an L1 data cache and an L1 instruction cache), the microprocessor 1000 also includes example shared memory 1010 that may be shared by the cores (e.g., Level 2 (L2 cache)) for high-speed access to data and/or instructions. Data and/or instructions may be transferred (e.g., shared) by writing to and/or reading from the shared memory 1010. The local memory 1020 of each of the cores 1002 and the shared memory 1010 may be part of a hierarchy of storage devices including multiple levels of cache memory and the main memory (e.g., the main memory 914, 916 of FIG. 9). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1002 may be referred to as a CPU, DSP, GPU, etc., or any other type of hardware circuitry. Each core 1002 includes control unit circuitry 1014, arithmetic and logic (AL) circuitry (sometimes referred to as an ALU) 1016, a plurality of registers 1018, the local memory 1020, and a second example bus 1022. Other structures may be present. For example, each core 1002 may include vector unit circuitry, single instruction multiple data (SIMD) unit circuitry, load/store unit (LSU) circuitry, branch/jump unit circuitry, floating-point unit (FPU) circuitry, etc. The control unit circuitry 1014 includes semiconductor-based circuits structured to control (e.g., coordinate) data movement within the corresponding core 1002. The AL circuitry 1016 includes semiconductor-based circuits structured to perform one or more mathematic and/or logic operations on the data within the corresponding core 1002. The AL circuitry 1016 of some examples performs integer based operations. In other examples, the AL circuitry 1016 also performs floating point operations. In yet other examples, the AL circuitry 1016 may include first AL circuitry that performs integer based operations and second AL circuitry that performs floating point operations. In some examples, the AL circuitry 1016 may be referred to as an Arithmetic Logic Unit (ALU). The registers 1018 are semiconductor-based structures to store data and/or instructions such as results of one or more of the operations performed by the AL circuitry 1016 of the corresponding core 1002. For example, the registers 1018 may include vector register(s), SIMD register(s), general purpose register(s), flag register(s), segment register(s), machine specific register(s), instruction pointer register(s), control register(s), debug register(s), memory management register(s), machine check register(s), etc. The registers 1018 may be arranged in a bank as shown in FIG. 10. Alternatively, the registers 1018 may be organized in any other arrangement, format, or structure including distributed throughout the core 1002 to shorten access time. The second bus 1022 may be implemented by at least one of an I2C bus, a SPI bus, a PCI bus, or a PCIe bus Each core 1002 and/or, more generally, the microprocessor 1000 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1000 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 11:
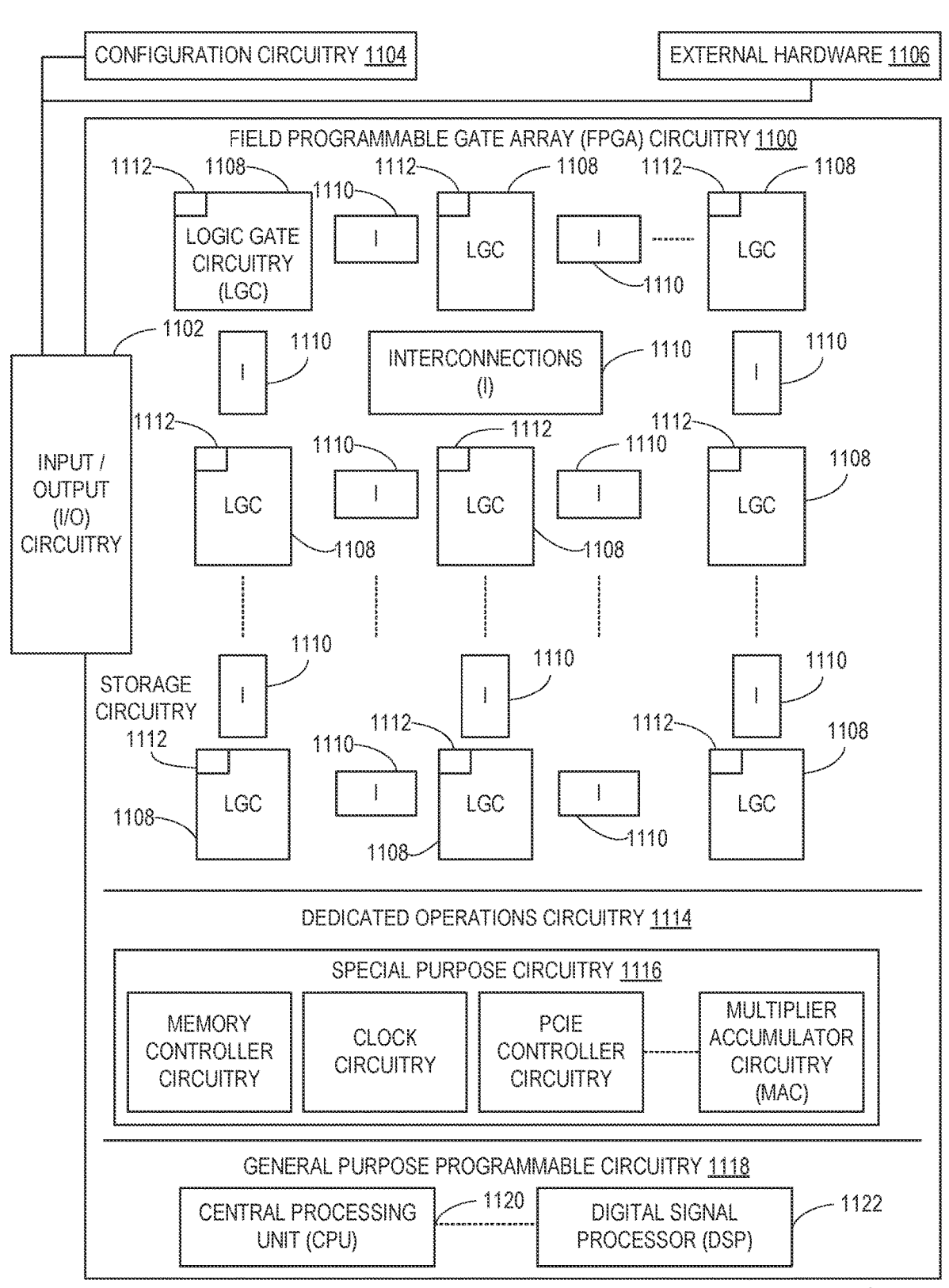
FIG. 11 is a block diagram of another example implementation of the processor circuitry of FIG. 9.

FIG. 11 is a block diagram of another example implementation of the processor circuitry 912 of FIG. 9. In this example, the processor circuitry 912 is implemented by FPGA circuitry 1100. For example, the FPGA circuitry 1100 may be implemented by an FPGA. The FPGA circuitry 1100 can be used, for example, to perform operations that could otherwise be performed by the example microprocessor 1000 of FIG. 10 executing corresponding machine-readable instructions. However, once configured, the FPGA circuitry 1100 instantiates the machine-readable instructions in hardware and, thus, can often execute the operations faster than they could be performed by a general purpose microprocessor executing the corresponding software.

More specifically, in contrast to the microprocessor 1000 of FIG. 10 described above (which is a general purpose device that may be programmed to execute some or all of the machine-readable instructions represented by the flowcharts of FIGS. 5-8 but whose interconnections and logic circuitry are fixed once fabricated), the FPGA circuitry 1100 of the example of FIG. 11 includes interconnections and logic circuitry that may be configured and/or interconnected in different ways after fabrication to instantiate, for example, some or all of the machine-readable instructions represented by the flowcharts of FIGS. 5-8. In particular, the FPGA circuitry 1100 may be thought of as an array of logic gates, interconnections, and switches. The switches can be programmed to change how the logic gates are interconnected by the interconnections, effectively forming one or more dedicated logic circuits (unless and until the FPGA circuitry 1100 is reprogrammed). The configured logic circuits enable the logic gates to cooperate in different ways to perform different operations on data received by input circuitry. Those operations may correspond to some or all of the software represented by the flowcharts of FIGS. 5-8. As such, the FPGA circuitry 1100 may be structured to effectively instantiate some or all of the machine-readable instructions of the flowcharts of FIGS. 5-8 as dedicated logic circuits to perform the operations corresponding to those software instructions in a dedicated manner analogous to an ASIC. Therefore, the FPGA circuitry 1100 may perform the operations corresponding to the some or all of the machine-readable instructions of FIGS. 5-8 faster than the general purpose microprocessor can execute the same.

In the example of FIG. 11, the FPGA circuitry 1100 is structured to be programmed (and/or reprogrammed one or more times) by an end user by a hardware description language (HDL) such as Verilog. The FPGA circuitry 1100 of FIG. 11, includes example input/output (I/O) circuitry 1102 to obtain and/or output data to/from example configuration circuitry 1104 and/or external hardware 1106. For example, the configuration circuitry 1104 may be implemented by interface circuitry that may obtain machine-readable instructions to configure the FPGA circuitry 1100, or portion(s) thereof. In some such examples, the configuration circuitry 1104 may obtain the machine-readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1106 may be implemented by external hardware circuitry. For example, the external hardware 1106 may be implemented by the microprocessor 1000 of FIG. 10. The FPGA circuitry 1100 also includes an array of example logic gate circuitry 1108, a plurality of example configurable interconnections 1110, and example storage circuitry 1112. The logic gate circuitry 1108 and the configurable interconnections 1110 are configurable to instantiate one or more operations that may correspond to at least some of the machine-readable instructions of FIGS. 5-8 and/or other desired operations. The logic gate circuitry 1108 shown in FIG. 11 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1108 to enable configuration of the electrical structures and/or the logic gates to form circuits to perform desired operations. The logic gate circuitry 1108 may include other electrical structures such as look-up tables (LUTs), registers (e.g., flip-flops or latches), multiplexers, etc.

The configurable interconnections 1110 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1108 to program desired logic circuits.

The storage circuitry 1112 of the illustrated example is structured to store result(s) of the one or more of the operations performed by corresponding logic gates. The storage circuitry 1112 may be implemented by registers or the like. In the illustrated example, the storage circuitry 1112 is distributed amongst the logic gate circuitry 1108 to facilitate access and increase execution speed.

The example FPGA circuitry 1100 of FIG. 11 also includes example Dedicated Operations Circuitry 1114. In this example, the Dedicated Operations Circuitry 1114 includes special purpose circuitry 1116 that may be invoked to implement commonly used functions to avoid the need to program those functions in the field. Examples of such special purpose circuitry 1116 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1100 may also include example general purpose programmable circuitry 1118 such as an example CPU 1120 and/or an example DSP 1122. Other general purpose programmable circuitry 1118 may additionally or alternatively be present such as a GPU, an XPU, etc., that can be programmed to perform other operations.

Although FIGS. 10 and 11 illustrate two example implementations of the processor circuitry 912 of FIG. 9, many other approaches are contemplated. For example, as mentioned above, modern FPGA circuitry may include an onboard CPU, such as one or more of the example CPU 1120 of FIG. 11. Therefore, the processor circuitry 912 of FIG. 9 may additionally be implemented by combining the example microprocessor 1000 of FIG. 10 and the example FPGA circuitry 1100 of FIG. 11. In some such hybrid examples, a first portion of the machine-readable instructions represented by the flowcharts of FIGS. 5-8 may be executed by one or more of the cores 1002 of FIG. 10, a second portion of the machine-readable instructions represented by the flowcharts of FIGS. 5-8 may be executed by the FPGA circuitry 1100 of FIG. 11, and/or a third portion of the machine-readable instructions represented by the flowcharts of FIGS. 5-8 may be executed by an ASIC. It should be understood that some or all of the false positive suppression circuitry 200 of FIG. 2 may, thus, be instantiated at the same or different times. Some or all of the circuitry may be instantiated, for example, in one or more threads executing concurrently and/or in series. Moreover, in some examples, some or all of the false positive suppression circuitry 200 of FIG. 2 may be implemented within one or more virtual machines and/or containers executing on the microprocessor.

In some examples, the processor circuitry 912 of FIG. 9 may be in one or more packages. For example, the microprocessor 1000 of FIG. 10 and/or the FPGA circuitry 1100 of FIG. 11 may be in one or more packages. In some examples, an XPU may be implemented by the processor circuitry 912 of FIG. 9, which may be in one or more packages. For example, the XPU may include a CPU in one package, a DSP in another package, a GPU in yet another package, and an FPGA in still yet another package.

Figure 12:
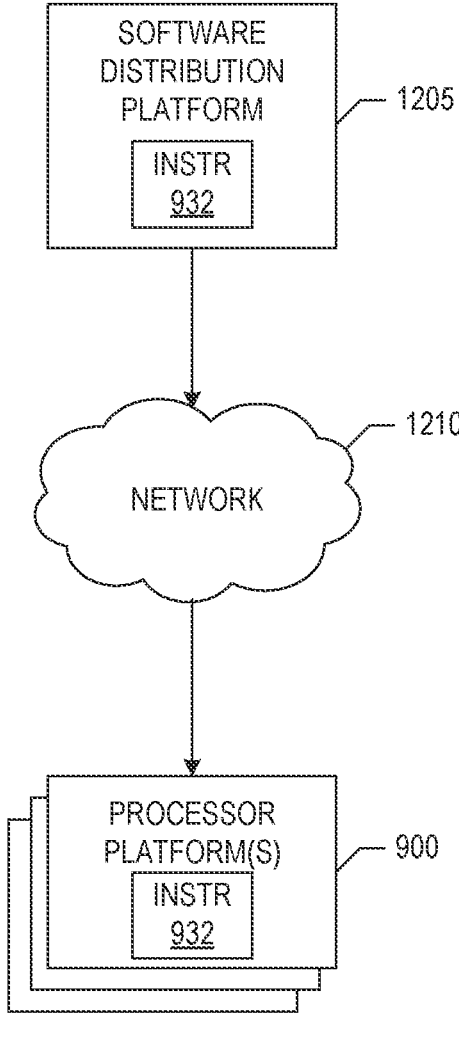
FIG. 12 is a block diagram of an example software distribution platform (e.g., one or more servers) to distribute software (e.g., software corresponding to the example machine-readable instructions of FIGS. 5-8) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1205 to distribute software such as the example machine-readable instructions 932 of FIG. 9 to hardware devices owned and/or operated by third parties is illustrated in FIG. 12. The example software distribution platform 1205 may be implemented by any computer server, data facility, cloud service, etc., capable of storing and transmitting software to other computing devices. The third parties may be customers of the entity owning and/or operating the software distribution platform 1205. For example, the entity that owns and/or operates the software distribution platform 1205 may be a developer, a seller, and/or a licensor of software such as the example machine-readable instructions 832 of FIG. 8. The third parties may be consumers, users, retailers, OEMs, etc., who purchase and/or license the software for use and/or re-sale and/or sub-licensing. In the illustrated example, the software distribution platform 1205 includes one or more servers and one or more storage devices. The storage devices store the machine-readable instructions 832, which may correspond to the example machine-readable instructions 500, 600, 700, 800 of FIGS. 5-8, as described above. The one or more servers of the example software distribution platform 1205 are in communication with an example network 1210, which may correspond to any one or more of the Internet and/or any of the example networks 116, 926 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine-readable instructions 832 from the software distribution platform 1205. For example, the software, which may correspond to the example machine-readable instructions 500, 600, 700, 800 of FIGS. 5-8, may be downloaded to the example processor platform 900, which is to execute the machine-readable instructions 832 to implement the false positive suppression circuitry 200 of FIG. 2. In some examples, one or more servers of the software distribution platform 1205 periodically offer, transmit, and/or force updates to the software (e.g., the example machine-readable instructions 832 of FIG. 8) to ensure improvements, patches, updates, etc., are distributed and applied to the software at the end user devices.

From the foregoing, it will be appreciated that example systems, methods, apparatus, and articles of manufacture have been disclosed for suppression of false positive malware detection. Disclosed systems, methods, apparatus, and articles of manufacture can identify samples automatically and accurately for suppression in a scalable fashion whilst making a balanced trade-off between over and under suppression. Disclosed systems, methods, apparatus, and articles of manufacture can generate and/or determine false positive suppression rules based on data associated with false positive detections of malware, which can yield an improved false positive malware detection suppression model over prior malware detection models. Disclosed systems, methods, apparatus, and articles of manufacture improve the efficiency of using a computing device by suppressing erroneous identifications of malware from preventing the computing device from executing desired functions, operations, and/or workloads. Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture for suppression of false positive malware detection are disclosed herein. Further examples and combinations thereof include the following:

Example 1 includes an apparatus comprising at least one memory, machine-readable instructions, and processor circuitry to at least one of instantiate or execute the machine-readable instructions to execute a machine-learning model based on a feature associated with an executable file to generate a malware detection output, identify, after a first determination that the malware detection output identifies the executable file as malware, the malware detection output as a false positive malware detection output based on the feature invoking a false positive suppression rule, and cause execution of the executable file based on the identification of the malware detection output as the false positive malware detection output.

Example 2 includes the apparatus of example 1, wherein the processor circuitry is to identify the malware detection output as a true positive malware detection output based on the feature not invoking the false positive suppression rule.

Example 3 includes the apparatus of example 2, wherein the processor circuitry is to execute a malware protection operation based on the identification of the malware detection output as the true positive malware detection output.

Example 4 includes the apparatus of example 3, wherein the malware protection operation is one of a quarantining of the executable file, a halting of execution of the executable file, a prevention of execution of the executable file, a deletion of the executable file, or a sandboxing of the executable file.

Example 5 includes the apparatus of example 1, wherein the executable file is a portable execution file included in a container file.

Example 6 includes the apparatus of example 1, wherein the feature is a signature, a type of machine on an endpoint device, a number of sections of a section table, or a size of a header of the executable file.

Example 7 includes the apparatus of example 1, wherein the feature is a first feature, the executable file is a first executable file, the malware detection output is a first malware detection output, and the processor circuitry is to identify second malware detection outputs associated with second executable files as false positive malware detection outputs, generate first data associations of the false positive malware detection outputs and second features of the second executable files, identify third malware detection outputs associated with third executable files as non-false positive malware detection outputs, generate second data associations of the non-false positive malware detection outputs and third features of the third executable files, and execute a rulefit model based on the first data associations and the second data associations to output the false positive suppression rule.

Example 8 includes the apparatus of example 7, wherein the processor circuitry is to cause transmission of the false positive suppression rule to an endpoint device.

Example 9 includes at least one non-transitory computer readable storage medium comprising instructions that, when executed, cause processor circuitry to at least execute a machine-learning model, based on a feature associated with an executable file, to generate a malware detection output, after a first determination that the malware detection output identifies the executable file as malware, identify the malware detection output as a false positive malware detection output based on the feature invoking a false positive suppression rule, and cause execution of the executable file based on the identification of the malware detection output as the false positive malware detection output.

Example 10 includes the at least one non-transitory computer readable storage medium of example 9, wherein the instructions are to cause the processor circuitry to identify the malware detection output as a true positive malware detection output based on the feature not invoking the false positive suppression rule.

Example 11 includes the at least one non-transitory computer readable storage medium of example 10, wherein the instructions are to cause the processor circuitry to execute a malware protection operation based on the identification of the malware detection output as the true positive malware detection output.

Example 12 includes the at least one non-transitory computer readable storage medium of example 11, wherein the instructions are to cause the processor circuitry to execute the malware protection operation as one of a quarantining of the executable file, a halting of execution of the executable file, a prevention of execution of the executable file, a deletion of the executable file, or a sandboxing of the executable file.

Example 13 includes the at least one non-transitory computer readable storage medium of example 9, wherein the execution file is a portable execution file included in a container file.

Example 14 includes the at least one non-transitory computer readable storage medium of example 9, wherein the feature is a signature, a type of machine on an endpoint device, a number of sections of a section table, or a size of a header of the executable file.

Example 15 includes the at least one non-transitory computer readable storage medium of example 9, wherein the feature is a first feature, the executable file is a first executable file, the malware detection output is a first malware detection output, and the instructions are to cause the processor circuitry to identify second malware detection outputs associated with second executable files as false positive malware detection outputs, generate first data associations of the false positive malware detection outputs and second features of the second executable files, identify third malware detection outputs associated with third executable files as non-false positive malware detection outputs, generate second data associations of the non-false positive malware detection outputs and third features of the third executable files, and execute a rulefit model based on the first data associations and the second data associations to output the false positive suppression rule.

Example 16 includes the at least one non-transitory computer readable storage medium of example 15, wherein the instructions are to cause the processor circuitry to cause transmission of the false positive suppression rule to an endpoint device.

Example 17 includes a method comprising executing, by executing an instruction with a processor, a machine-learning model, based on a feature associated with an executable file, to generate a malware detection output, after a first determination that the malware detection output identifies the executable file as malware, identifying, by executing an instruction with the processor, the malware detection output as a false positive malware detection output based on the feature invoking a false positive suppression rule, and executing, by executing an instruction with the processor, the executable file based on the identification of the malware detection output as the false positive malware detection output.

Example 18 includes the method of example 17, further including identifying the malware detection output as a true positive malware detection output based on the feature not invoking the false positive suppression rule.

Example 19 includes the method of example 18, further including executing a malware protection operation based on the identification of the malware detection output as the true positive malware detection output.

Example 20 includes the method of example 19, wherein the malware protection operation is one of a quarantining of the executable file, a halting of execution of the executable file, a prevention of execution of the executable file, a deletion of the executable file, or a sandboxing of the executable file.

Example 21 includes the method of example 17, wherein the execution file is a portable execution file included in a container file Example 22 includes the method of example 17, wherein the feature is a signature, a type of machine on an endpoint device, a number of sections of a section table, or a size of a header of the executable file.

Example 23 includes the method of example 17, wherein the feature is a first feature, the executable file is a first executable file, the malware detection output is a first malware detection output, and the method further including identifying second malware detection outputs associated with second executable files as false positive malware detection outputs, generating first data associations of the false positive malware detection outputs and second features of the second executable files, identifying third malware detection outputs associated with third executable files as non-false positive malware detection outputs, generating second data associations of the non-false positive malware detection outputs and third features of the third executable files, and executing a rulefit model based on the first data associations and the second data associations to output the false positive suppression rule.

Example 24 includes the method of example 23, further including transmitting the false positive suppression rule to an endpoint device.

Example 25 includes an apparatus comprising means for executing a machine-learning model, based on a feature associated with an executable file, to generate a malware detection output, means for identifying, after a first determination that the malware detection output identifies the executable file as malware, the malware detection output as a false positive malware detection output based on the feature invoking a false positive suppression rule, and means for causing execution of the executable file based on the identification of the malware detection output as the false positive malware detection output.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus comprising:
at least one memory;
machine-readable instructions; and
processor circuitry to at least one of instantiate or execute the machine-readable instructions to:
    execute a machine-learning model based on a feature associated with an executable file to generate a malware detection output;

identify, after a first determination that the malware detection output identifies the executable file as malware, the malware detection output as a false positive malware detection output based on the feature associated with the executable file invoking false positive suppression rules, wherein the false positive suppression rules are generated based on an execution of a rulefit model trained on false positive detections of malware and non-false positive detections of malware, and wherein the false positive suppression rules include a first false positive suppression rule corresponding to a file size of the executable file and a second false positive suppression rule corresponding to a name of the executable file; and
    cause execution of the executable file based on the identification of the malware detection output as the false positive malware detection output.

2. The apparatus of claim 1, wherein the malware detection output is a first malware detection output, the feature associated with the executable file is a first feature associated with the executable file, and wherein the processor circuitry is to identify a second malware detection output as a true positive malware detection output based on a second feature associated with the executable file not invoking the false positive suppression rule.

3. The apparatus of claim 2, wherein the processor circuitry is to execute a malware protection operation based on the identification of the second malware detection output as the true positive malware detection output.

4. The apparatus of claim 3, wherein the malware protection operation is one of a quarantining of the executable file, a halting of the execution of the executable file, a prevention of the execution of the executable file, a deletion of the executable file, or a sandboxing of the executable file.

5. The apparatus of claim 1, wherein the executable file is a portable execution file included in a container file.

6. The apparatus of claim 1, wherein the feature is a signature, a type of machine on an endpoint device, a number of sections of a section table, or a size of a header of the executable file.

7. The apparatus of claim 1, wherein the feature associated with the executable file is a first feature associated with the executable file, the executable file is a first executable file, the malware detection output is a first malware detection output, and the processor circuitry is further to:
    identify second malware detection outputs associated with second executable files as false positive malware detection outputs;
    generate first data associations of the false positive malware detection outputs and second features of the second executable files;
    identify third malware detection outputs associated with third executable files as non-false positive malware detection outputs;
    generate second data associations of the non-false positive malware detection outputs and third features of the third executable files; and
    execute the rulefit model based on the first data associations and the second data associations to output the false positive suppression rule.

8. The apparatus of claim 7, wherein the processor circuitry is to cause transmission of the false positive suppression rules to an endpoint device.

9. At least one non-transitory computer readable storage medium comprising instructions that, when executed, cause processor circuitry to at least:

execute a machine-learning model based on a feature associated with an executable file to generate a malware detection output;

after a first determination that the malware detection output identifies the executable file as malware, identify the malware detection output as a false positive malware detection output based on the feature associated with the executable file invoking false positive suppression rules, wherein the false positive suppression rules are generated based on an execution of a rulefit model trained on false positive detections of malware and non-false positive detections of malware, and wherein the false positive suppression rules include a first false positive suppression rule corresponding to a file size of the executable file and a second false positive suppression rule corresponding to a name of the executable file; and cause execution of the executable file based on the identification of the malware detection output as the false positive malware detection output.

10. The at least one non-transitory computer readable storage medium of claim 9, wherein the malware detection output is a first malware detection output, the feature associated with the executable file is a first feature associated with the executable file, and wherein the instructions are to cause the processor circuitry to identify a second malware detection output as a true positive malware detection output based on a second feature associated with the executable file not invoking the false positive suppression rule.

11. The at least one non-transitory computer readable storage medium of claim 10, wherein the instructions are to cause the processor circuitry to execute a malware protection operation based on the identification of the second malware detection output as the true positive malware detection output.

12. The at least one non-transitory computer readable storage medium of claim 11, wherein the instructions are to cause the processor circuitry to execute the malware protection operation as one of a quarantining of the executable file, a halting of the execution of the executable file, a prevention of the execution of the executable file, a deletion of the executable file, or a sandboxing of the executable file.

13. The at least one non-transitory computer readable storage medium of claim 9, wherein the executable file is a portable execution file included in a container file.

14. The at least one non-transitory computer readable storage medium of claim 9, wherein the feature is a signature, a type of machine on an endpoint device, a number of sections of a section table, or a size of a header of the executable file.

15. The at least one non-transitory computer readable storage medium of claim 9, wherein the feature associated with the executable file is a first feature associated with the executable file, the executable file is a first executable file, the malware detection output is a first malware detection output, and the instructions are to cause the processor circuitry to:

identify second malware detection outputs associated with second executable files as false positive malware detection outputs;

generate first data associations of the false positive malware detection outputs and second features of the second executable files;

identify third malware detection outputs associated with third executable files as non-false positive malware detection outputs;

generate second data associations of the non-false positive malware detection outputs and third features of the third executable files; and execute the rulefit model based on the first data associations and the second data associations to output the false positive suppression rule.

16. The at least one non-transitory computer readable storage medium of claim 15, wherein the instructions are to cause the processor circuitry to cause transmission of the false positive suppression rules to an endpoint device.

17. A method comprising:

executing, by executing an instruction with a processor, a machine-learning model based on a feature associated with an executable file to generate a malware detection output;

after a first determination that the malware detection output identifies the executable file as malware, identifying, by executing an instruction with the processor, the malware detection output as a false positive malware detection output based on the feature invoking false positive suppression rules, wherein the false positive suppression rules are generated based on an execution of a rulefit model trained on false positive detections of malware and non-false positive detections of malware, and wherein the false positive suppression rules include a first false positive suppression rule corresponding to a file size of the executable file and a second false positive suppression rule corresponding to a name of the executable file; and executing, by executing an instruction with the processor, the executable file based on the identification of the malware detection output as the false positive malware detection output.

18. The method of claim 17, wherein the malware detection output is a first malware detection output, the feature associated with the executable file is a first feature associated with the executable file, and further including identifying a second malware detection output as a true positive malware detection output based on a second feature associated with the executable file not invoking the false positive suppression rules.

19. The method of claim 18, further including executing a malware protection operation based on the identification of the second malware detection output as the true positive malware detection output.

20. The method of claim 19, wherein the malware protection operation is one of a quarantining of the executable file, a halting of the execution of the executable file, a prevention of the execution of the executable file, a deletion of the executable file, or a sandboxing of the executable file.

21. The method of claim 17, wherein the executable file is a portable execution file included in a container file.

22. The method of claim 17, wherein the feature is a signature, a type of machine on an endpoint device, a number of sections of a section table, or a size of a header of the executable file.

23. The method of claim 17, wherein the feature associated with the executable file is a first feature associated with the executable file, the executable file is a first executable file, the malware detection output is a first malware detection output, and the method further including:

identifying second malware detection outputs associated with second executable files as false positive malware detection outputs;

generating first data associations of the false positive malware detection outputs and second features of the second executable files;

identifying third malware detection outputs associated with third executable files as non-false positive malware detection outputs;

generating second data associations of the non-false positive malware detection outputs and third features of the third executable files; and executing the rulefit model based on the first data associations and the second data associations to output the false positive suppression rules.

24. The method of claim 23, further including transmitting the false positive suppression rules to an endpoint device.

25. An apparatus comprising:

means for executing a machine-learning model based on a feature associated with an executable file to generate a malware detection output;

means for identifying, after a first determination that the malware detection output identifies the executable file as malware, the malware detection output as a false positive malware detection output based on the feature invoking false positive suppression rules, wherein the false positive suppression rules are generated based on an execution of a rulefit model trained on false positive detections of malware and non-false positive detections of malware, and wherein the false positive suppression rules include a first false positive suppression rule corresponding to a file size of the executable file and a second false positive suppression rule corresponding to a name of the executable file; and means for causing execution of the executable file based on the identification of the malware detection output as the false positive malware detection output.

\* \* \* \* \*